United States Patent
Ishida

(10) Patent No.: US 10,237,202 B2
(45) Date of Patent: Mar. 19, 2019

(54) NETWORK CONTROL DEVICE, NETWORK CONTROL METHOD, AND RECORDING MEDIUM FOR PROGRAM

(71) Applicant: NEC CORPORATION, Tokyo (JP)

(72) Inventor: Shinya Ishida, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 11 days.

(21) Appl. No.: 15/555,615

(22) PCT Filed: Mar. 3, 2016

(86) PCT No.: PCT/JP2016/001151
§ 371 (c)(1),
(2) Date: Sep. 5, 2017

(87) PCT Pub. No.: WO2016/143311
PCT Pub. Date: Sep. 15, 2016

(65) Prior Publication Data
US 2018/0083890 A1    Mar. 22, 2018

(30) Foreign Application Priority Data
Mar. 6, 2015    (JP) .................................. 2015-044738

(51) Int. Cl.
*H04L 12/911* (2013.01)
*H04L 12/24* (2006.01)

(52) U.S. Cl.
CPC .............. *H04L 47/82* (2013.01); *H04L 41/12* (2013.01)

(58) Field of Classification Search
CPC combination set(s) only.
See application file for complete search history.

(56) References Cited

U.S. PATENT DOCUMENTS 7,889,675 B2    2/2011    Mack-Crane et al.
7,903,557 B1    3/2011    Colloff et al.
(Continued)

FOREIGN PATENT DOCUMENTS

EP    2403290 A1    1/2012
JP    10-070571 A    3/1998
(Continued)

OTHER PUBLICATIONS

Yohei Iizawa, et al., "Special Issue on SDN for Advancing ICT Systems: Multiplayer Abstraction Technology Providing Integrated Control Platform for Heterogeneous Networks", NEC Technical Journal, Feb. 1, 2014, pp. 44 to 47, vol. 66, No. 2.
(Continued)

*Primary Examiner* — Khaled M Kassim
*Assistant Examiner* — Syed Ali
(74) *Attorney, Agent, or Firm* — Sughrue Mion, PLLC

(57) ABSTRACT

In order to make it possible for an upper layer to receive the supply of a desired resource from a lower layer and make it possible to suitably grasp a trend in requests for a lower layer resource, this network control device is provided with: an upper hierarchical layer control unit that receives a request for an upper virtual link settable for the purpose of connecting user ports connected to an upper layer network, determines the performance of the settable upper virtual link, and associates and retains the result; and a lower hierarchical layer control unit that receives a request for a lower virtual link settable for the purpose of connecting ports within the upper layer network via a lower layer network, determines the performance of the settable lower virtual link, and associates and retains the result. The upper hierarchical layer control unit comprises: a resource demand prediction unit that predicts a future request on the basis of the request history of the settable upper virtual link; and a
(Continued)

capacity design unit that calculates the resources of the lower layer network required for a predicted request. The upper hierarchical layer control unit sends a request to the lower hierarchical layer control unit for a settable lower virtual link corresponding to a calculated resource and sets a flow corresponding to the settable lower virtual link in the lower layer network.

16 Claims, 20 Drawing Sheets

(56) References Cited

U.S. PATENT DOCUMENTS

| | | | |
|---|---|---|---|
| 8,532,087 B2 | 9/2013 | Kojima et al. | |
| 2002/0116485 A1* | 8/2002 | Black | H04L 29/06 709/223 |
| 2002/0165961 A1* | 11/2002 | Everdell | H04L 41/22 709/225 |
| 2003/0126195 A1* | 7/2003 | Reynolds | G06F 1/14 709/203 |
| 2005/0198247 A1* | 9/2005 | Perry | H04L 7/0008 709/223 |
| 2007/0005808 A1* | 1/2007 | Day | H04L 41/145 709/248 |
| 2011/0206019 A1* | 8/2011 | Zhai | H04W 56/00 370/336 |
| 2016/0241469 A1* | 8/2016 | Iizawa | H04L 45/64 |

FOREIGN PATENT DOCUMENTS

| | | |
|---|---|---|
| JP | 2003-324473 A | 11/2003 |
| JP | 2006-013926 A | 1/2006 |
| JP | 2007-530967 A | 11/2007 |
| JP | 2008-211551 A | 9/2008 |
| WO | 2004071033 A1 | 8/2004 |
| WO | 2014/054691 A1 | 4/2014 |

OTHER PUBLICATIONS

Yohei Iizawa, et al., "Dynamic Multi-layer Path Control Using Virtual Links", Proceedings of the 2014 IEICE General Conference Communications 2, Mar. 21, 2014, p. 162.
International Search Report for PCT/JP2016/001151 dated May 24, 2016 [PCT/ISA/210].
Written Opinion for PCT/JP2016/001151 dated May 24, 2016 [PCT/ISA/237].
Communication dated Jul. 25, 2018, from the European Patent Office in counterpart European Application No. 16761286.0.
Communication dated Aug. 22, 2018, from the Russian Federal Service for Intellectual Property in counterpart Application No. 2017135251/08.

* cited by examiner

FIG. 8

POTENTIAL LINK DB 107

PORT INFORMATION 107B

| Port ID | Node ID | Link ID | Assigned |
|---|---|---|---|
| P301 | N11 | -- | TRUE |
| P302 | N12 | -- | TRUE |
| P303 | N12 | -- | TRUE |
| P304 | N13 | -- | TRUE |
| P801 | N11 | -- | FALSE |
| P802 | N11 | -- | FALSE |
| P803 | N12 | -- | FALSE |
| P804 | N12 | -- | FALSE |
| P805 | N13 | -- | FALSE |
| P806 | N13 | -- | FALSE |

LINK INFORMATION 107C

| Link ID | Src Port ID | Dst Port ID | Established | Delay |
|---|---|---|---|---|
| L901 | P802 | P803 | FALSE | 100msec |
| L902 | P804 | P805 | FALSE | 100msec |
| L903 | P801 | P806 | FALSE | 300msec |

FLOW INFORMATION 107D

| Flow ID | Path | Match | Action | Status |
|---|---|---|---|---|
| -- | -- | -- | -- | -- |

FIG. 10

LOWER LAYER NWDB 103

NODE INFORMATION 103A

| Node ID |
|---|
| N11 |
| N12 |
| N13 |

LINK INFORMATION 103C

| Link ID | Src Port ID | Dst Port ID | Delay |
|---|---|---|---|
| L601 | P408 | P409 | 100msec |
| L602 | P410 | P411 | 100msec |
| L603 | P407 | P412 | 300msec |

PORT INFORMATION 103B

| Port ID | Node ID | Link ID |
|---|---|---|
| P401 | N21 | — |
| P402 | N21 | — |
| P403 | N22 | — |
| P404 | N22 | — |
| P405 | N23 | — |
| P406 | N23 | — |

| Port ID | Node ID | Link ID |
|---|---|---|
| P407 | N21 | L603 |
| P408 | N21 | L601 |
| P409 | N22 | L601 |
| P410 | N22 | L602 |
| P411 | N23 | L602 |
| P412 | N23 | L603 |

FLOW INFORMATION 103D

| Flow ID | Path | Match | Action | Status |
|---|---|---|---|---|
| — | — | — | — | — |

FIG. 11

LAYER BOUNDARY INFORMATION

| Border ID | UpperNW Node ID | UpperNW Port ID | LowerNW Node ID | LowerNW Port ID |
|---|---|---|---|---|
| B501 | N11 | P305 | N21 | P401 |
| B502 | N11 | P306 | N21 | P402 |
| B503 | N12 | P307 | N22 | P403 |
| B504 | N12 | P308 | N22 | P404 |
| B505 | N13 | P309 | N23 | P405 |
| B506 | N13 | P310 | N23 | P406 |

FIG. 13

USER NWDB101

PORT INFORMATION 101B

| Port ID | Node ID | Link ID | Assigned |
|---------|---------|---------|----------|
| U1 | N11 | -- | TRUE |
| U2 | N12 | -- | TRUE |

LINK INFORMATION 101C

| Link ID | Src Port ID | Dst Port ID | Established | Delay |
|---------|-------------|-------------|-------------|-------|
| X | U1 | U2 | TRUE | 200msec |

FLOW INFORMATION 101D

| Flow ID | Path | Match | Action | Status |
|---------|------|-------|--------|--------|
| F701 | X | IN Port = U1 | OUT Port = U2 | SET |

FIG. 16

POTENTIAL LINK DB 107

PORT INFORMATION 107B

| Port ID | Node ID | Link ID | Assigned |
|---------|---------|---------|----------|
| P801    | N11     | L903    | FALSE    |
| P802    | N11     | L901    | TRUE     |
| P803    | N12     | L901    | TRUE     |
| P804    | N12     | L902    | TRUE     |
| P805    | N13     | L902    | TRUE     |
| P806    | N13     | L903    | FALSE    |

LINK INFORMATION 107C

| Link ID | Src Port ID | Dst Port ID | Established | Delay   |
|---------|-------------|-------------|-------------|---------|
| L901    | P802        | P803        | TRUE        | 100msec |
| L902    | P804        | P805        | TRUE        | 100msec |
| L903    | P801        | P806        | FALSE       | 300msec |

FLOW INFORMATION 107D

| Flow ID | Path | Match          | Action          | Status |
|---------|------|----------------|-----------------|--------|
| F901    | L901 | IN Port = P801 | OUT Port = P803 | SET    |
| F902    | L902 | IN Port = P804 | OUT Port = P805 | SET    |

FIG. 17

UPPER LAYER NWDB102

NODE INFORMATION 102A

PORT INFORMATION 102B

| Port ID | Node ID | Link ID |
|---------|---------|---------|
| P301 | N11 | - |
| P302 | N12 | - |
| P303 | N12 | - |
| P304 | N13 | - |
| P305 | N11 | - |
| P306 | N11 | L001 |
| P307 | N12 | L001 |
| P308 | N12 | L002 |
| P309 | N13 | L002 |
| P310 | N13 | - |

LINK INFORMATION 102C

| Link ID | Src Port ID | Dst Port ID | Delay |
|---------|-------------|-------------|-------|
| L001 | P306 | P307 | 100msec |
| L002 | P308 | P309 | 100msec |

FLOW INFORMATION 102D

| Flow ID | Path | Match | Action | Status |
|---------|------|-------|--------|--------|
| F702 | L001-L002 | Node = N11<br>IN Port = P301 | Node = N13<br>OUT Port = P304 | SET |

NETWORK CONTROL DEVICE, NETWORK CONTROL METHOD, AND RECORDING MEDIUM FOR PROGRAM

CROSS REFERENCE TO RELATED APPLICATIONS

This application is a National Stage of International Application No. PCT/JP2016/001151 filed Mar. 3, 2016, claiming priority based on Japanese Patent Application No. 2015-044738 filed Mar. 6, 2015, the contents of all of which are incorporated herein by reference in their entirety.

TECHNICAL FIELD

The present invention relates to a network control device, a network control method, and a program, and relates particularly to a control technology and a design technology of a multilayer network and a multi-domain network.

BACKGROUND ART

A communication carrier network is composed of a plurality of layers (network layers). For example, a network combining a packet layer enabling efficient use of a network resource by a statistical multiplexing effect, and an optical layer suitable for long-distance and high-capacity transmission, has been constructed. Known packet layer technologies include, for example, Multi-Protocol Label Switching (MPLS) and Multi-Protocol Label Switching-Transport Profile (MPLS-TP). Further, an optical layer is generally a circuit switched network, and an Optical Transport Network (OTN) is known as a typical technology. The OTN is further internally divided into layers such as time division multiplexing (TDM) and wavelength division multiplexing (WDM) layers, based on a difference in a path switching method. In general, independent control for each layer is performed on the networks.

Meanwhile, a technology of integrating control of a multilayer network is receiving attention. The reason is that an operational cost can be reduced by automated setting of a multilayer network, and also an equipment cost can be reduced by efficient utilization of a resource, based on information about a plurality of layers. As an example, PTL 1 discloses a multilayer path control technology by centralized topology design in a two-layered network based on a packet and WDM.

Further, PTL 2 describes a method of abstracting information about a path settable in a lower layer in a form of a node or a link, and advertising the information by a routing protocol in an upper layer, in order to enable optimum path setting.

Furthermore, in a technology described in PTL 3, a measurement result of an amount of traffic flowing over an upper path (a logical path in a packet network) is acquired in a multilayer network composed of the packet network and a circuit switched network. Then, routes in the circuit switched network and the packet network are calculated, and, when congestion occurs by traffic concentration in a part of lower layer links, a route avoiding the lower layer link is calculated.

Further, PTL 4 describes measuring an amount of upper layer traffic and performing setting change of a lower layer path (for example, controlling a number of lower layer paths), based on the amount of traffic. PTL 5 describes a technology for establishing a connection between a source node and a destination node in a short period of time, and PTL 6 describes a technology for generating a new route to a destination node.

CITATION LIST

Patent Literature

PTL 1: Japanese Unexamined Patent Application Publication No. 2008-211551
PTL 2: U.S. Pat. No. 7,889,675
PTL 3: Japanese Unexamined Patent Application Publication No. 2006-013926
PTL 4: Japanese Unexamined Patent Application Publication No. 2003-324473
PTL 5: Japanese Unexamined Patent Application Publication No. H10-070571
PTL 6: Japanese Translation of PCT International Application Publication No. 2007-530967

SUMMARY OF INVENTION

Technical Problem

The entire disclosure of aforementioned PTLs is incorporated herein by reference thereto. The following analysis has been made by the present inventor.

In the aforementioned integrated control technologies for a multilayer network, when searching an upper layer network for a path route, only a link in a section for which path setting is already done in a lower layer is considered. For example, in the aforementioned multilayer network, paths and links have a nested configuration. Specifically, in a lower layer network, a path is set by using a node, a port, and a link in the lower layer as a network resource. In an upper layer network, a path already set in the lower layer is treated as a link between nodes, which becomes a network resource in the upper layer by adding information about a node and a port, and a path in the upper layer is set by using the resource.

For example, in the technologies, even when a path with a lower delay may be set in an upper layer by additionally setting a lower layer path and increasing upper layer links, the upper layer is not able to be aware of the entire network being in such a state. Consequently, the upper layer has to use only a resource already existing as an upper layer link for which a lower layer path is already set. Even in the multilayer path control method by PTL 1, calculation and setting of an upper layer path considering addition of a link not set in the upper layer cannot be performed.

The method of abstracting information about a path settable in a lower layer in a form of a node or a link, and advertising the information by a routing protocol in an upper layer, being described in PTL 2, is able to set an optimum path even in such a case. However, in the method in PTL 2, in a case that an upper layer path satisfying a requirement related to a bandwidth, a delay, and the like cannot be calculated even when the advertised resource information in the lower layer is included, path setting fails. This is caused by a path requirement demanded in the upper layer not being properly conveyed to the lower layer.

Further, the technologies described in PTLs 3 to 6 are not able to solve such a problem.

Accordingly, it is desirable to enable an upper layer to be supplied with a desired resource from a lower layer.

Meanwhile, when consumption of a lower layer resource by an upper layer increases, the lower layer resource may fall short. In the technology described in PTL 4, a usage mode of a resource of a lower layer path is merely changed based on an amount of upper layer traffic. For example, detailed needs for the lower layer resource such as a node, a link, and a port in the lower layer required for establishing a specific link in the upper layer, and a trend of the needs cannot be grasped.

Accordingly, an issue is to enable an upper layer to be supplied with a desired resource from a lower layer and to properly grasp a trend of a request for the lower layer resource. An object of the present invention is to provide a network control device, a network control method, and a program that contribute to solution of such an issue.

Solution to Problem

A network control device according to a first aspect of the present invention includes an upper hierarchical control unit that accepts a request, by a user connecting to an upper layer network, for a settable upper virtual link for connecting ports, obtains performance of the settable upper virtual link, and holds the settable upper virtual link and the performance in an associated manner, and a lower hierarchical control unit that accepts a request for a settable lower virtual link for connecting ports in the upper layer network through a lower layer network, obtains performance of the settable lower virtual link, and holds the settable lower virtual link and the performance in an associated manner. The upper hierarchical control unit further includes a resource demand prediction unit that predicts a future request for the upper virtual link, based on a history of requests for a plurality of the settable upper virtual links, and a capacity design unit that calculates a resource of the lower layer network required for supplying the upper virtual link for a predicted request for the upper virtual link, requests the settable lower virtual link corresponding to an additional resource calculated by the capacity design unit, to the lower hierarchical control unit, accepts a request for an upper virtual link selected depending on the settable upper virtual link and performance of the settable upper link, and, when a route of a flow related to the requested upper virtual link includes the settable lower virtual link, requests the settable lower virtual link to the lower hierarchical control unit and sets a flow related to the settable lower virtual link to the lower layer network.

A network control method according to a second aspect of the present invention includes, by a network control device, a step of accepting a request, by a user connecting to an upper layer network, for a settable upper virtual link for connecting ports, obtaining performance of the settable upper virtual link, and holding the settable upper virtual link and the performance in an associated manner, a step of accepting a request for a settable lower virtual link for connecting ports in the upper layer network through a lower layer network, obtaining performance of the settable lower virtual link, and holding the settable lower virtual link and the performance in an associated manner, a step of accepting a request for an upper virtual link selected depending on the settable upper virtual link and performance of the settable upper link, a step of, when a route of a flow related to the requested upper virtual link includes the settable lower virtual link, setting a flow related to the settable lower virtual link to the lower layer network, a step of predicting a future request for the upper virtual link, based on a history of requests for a plurality of the settable upper virtual links, and a step of calculating a resource of the lower layer network required for supplying the upper virtual link for a predicted request for the upper virtual link.

A program according to a third aspect of the present invention causes a computer to achieve processing of accepting a request, by a user connecting to an upper layer network, for a settable upper virtual link for connecting ports, obtaining performance of the settable upper virtual link, and holding the settable upper virtual link and the performance in an associated manner, processing of accepting a request for a settable lower virtual link for connecting ports in the upper layer network through a lower layer network, obtaining performance of the settable lower virtual link, and holding the settable lower virtual link and the performance in an associated manner, processing of accepting a request for an upper virtual link selected depending on the settable upper virtual link and performance of the settable upper virtual link, processing of, when a route of a flow related to the requested upper virtual link includes the settable lower virtual link, setting a flow related to the settable lower virtual link to the lower layer network, processing of predicting a future request for the upper virtual link, based on a history of requests for a plurality of the settable upper virtual links, and processing of calculating a resource of the lower layer network required for supplying the upper virtual link for a predicted request for the upper virtual link. The program may be provided as a program product recorded in a non-transitory computer-readable recording medium.

Advantageous Effects of Invention

A network control device, a network control method, and a program, according to the present invention, enable an upper layer to be supplied with a desired resource from a lower layer and to properly grasp a trend of a request for a lower layer resource.

BRIEF DESCRIPTION OF DRAWINGS

FIG. 8 is a diagram exemplifying a data structure of a potential link database after creating potential link database information as illustrated in FIG. 6.

FIG. 10 is a diagram exemplifying a data structure of a lower layer network database after creating potential link database information as illustrated in FIG. 6.

FIG. 11 is a diagram exemplifying layer boundary information held by a layer boundary information management unit in the network control device according to the first example embodiment.

FIG. 13 is a diagram exemplifying a data structure of a user network database after creating user network database information as illustrated in FIG. 12.

FIG. 16 is a diagram exemplifying a data structure of the user network database after setting a flow as illustrated in FIG. 14.

FIG. 17 is a diagram exemplifying a data structure of the upper layer network database after setting a flow as illustrated in FIG. 14.

DESCRIPTION OF EMBODIMENTS

First, an overview of one example embodiment will be described. A reference sign added to the overview is solely an exemplification for assisting in understanding, and is not intended to limit the present invention to the illustrated mode. Further, an arrow between blocks illustrated in a drawing indicates an example of a signal direction, and does not limit the signal direction.

Figure 1:
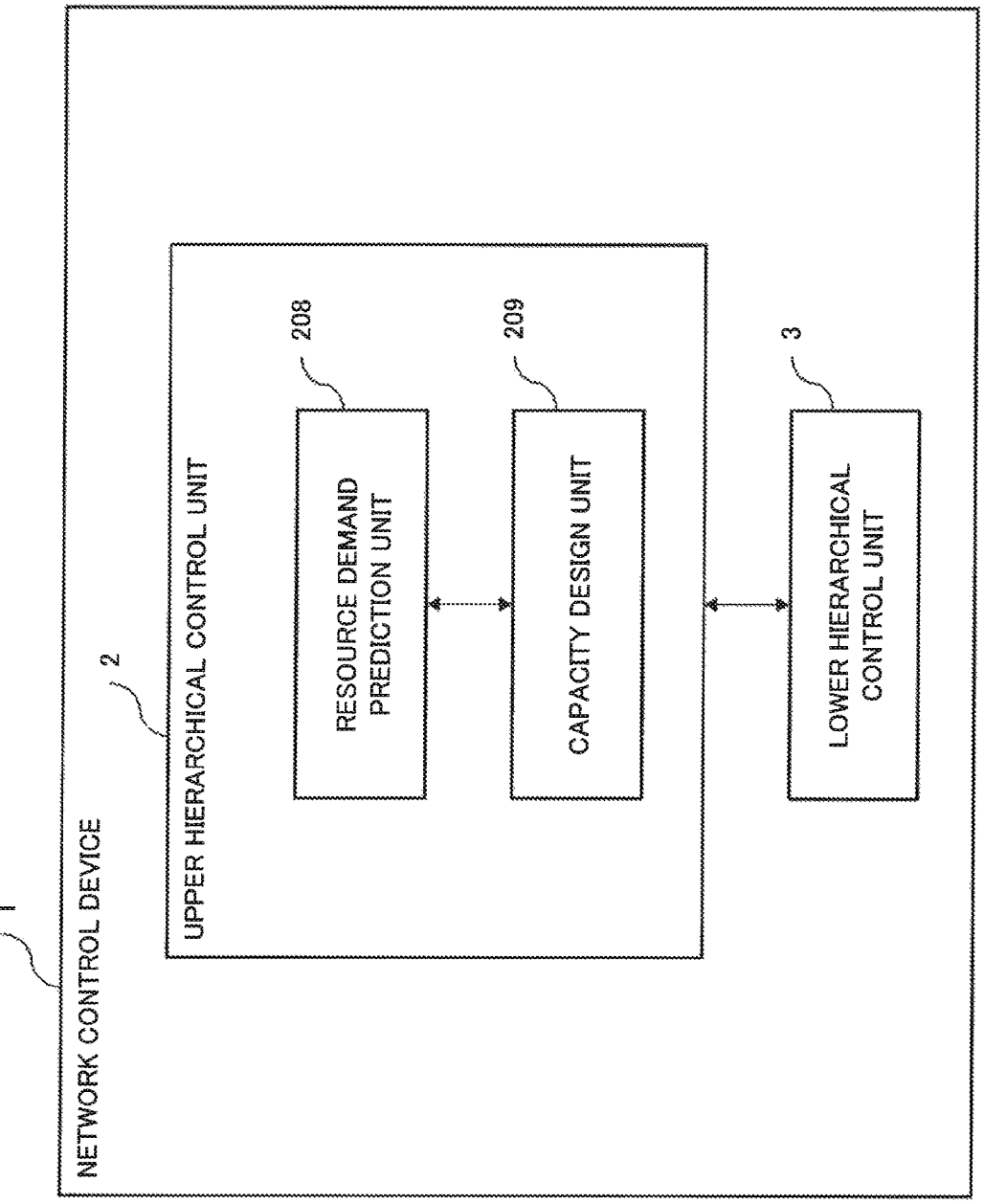
FIG. 1 is a block diagram exemplifying a configuration of a network control device according to one example embodiment.

FIG. 1 is a block diagram exemplifying a configuration of a network control device 1 according to one example embodiment. Referring to FIG. 1, the network control device 1 includes an upper hierarchical control unit 2 and a lower hierarchical control unit 3. The upper hierarchical control unit 2 further includes a resource demand prediction unit 208 and a capacity design unit 209. An operation according to the one example embodiment is exemplified in FIG. 15.

Figure 15:
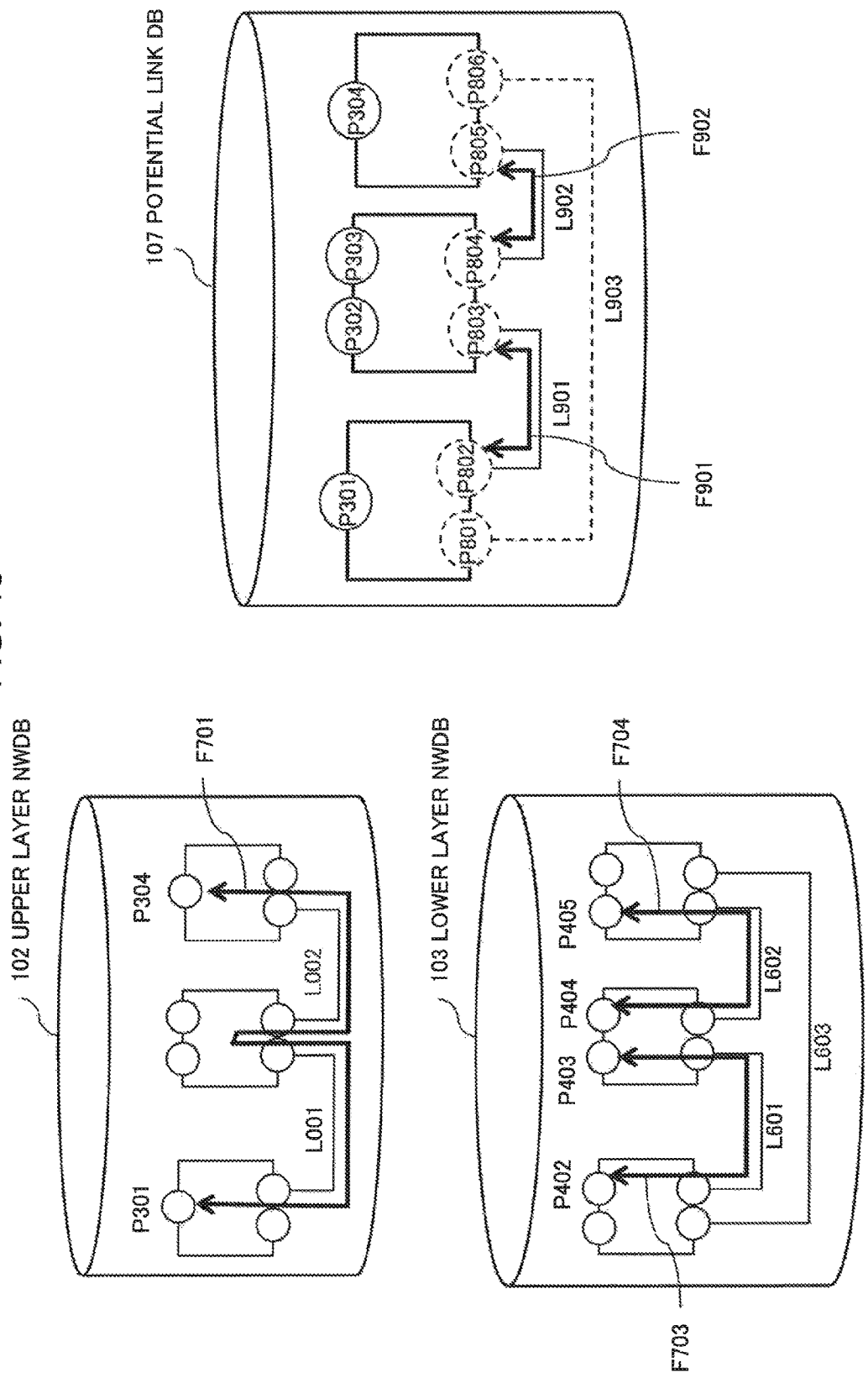
FIG. 15 is a diagram for illustrating information held by each network database information after setting a flow as illustrated in FIG. 14.

The upper hierarchical control unit 2 accepts a request for connecting ports on nodes included in an upper layer network (for example, ports P802 and P803, ports P804 and P805, and ports P801 and P806 in FIG. 15). The lower hierarchical control unit 3 obtains a link (for example, links L901 to L903 in FIG. 15) connecting the ports through a lower layer network and performance of the link (for example, a bandwidth and a delay of the link), and holds the link and the performance in an associated manner. Additionally, the upper hierarchical control unit 2 accepts a flow between nodes in the upper layer network, the flow being selected in accordance with the link and the performance. When a route of the flow includes the link (for example, the links L901 and L902 in FIG. 15), the upper hierarchical control unit 2 sets a flow related to the link to the lower layer network.

Based on a history of a plurality of the requests (i.e. requests for connecting ports on nodes included in the upper layer network), the resource demand prediction unit 208 predicts such a request in the future. The capacity design unit 209 calculates a resource of the lower layer network required for supplying the link for the predicted request.

Specifically, when controlling a multilayer network composed of networks in a plurality of layers, the network control device 1 according to the one example embodiment performs the following procedure. Specifically, the network control device 1 generates a link in an upper layer network, based on topology information about a lower layer network and a request presented by a user for connecting ports on nodes included in the upper layer network. The request presented by a user for connecting ports on nodes included in the upper layer network is hereinafter referred to as a "potential link request," and a link generated based on a potential link request is hereinafter referred to as a "potential link." For example, generated links are the links L901 to L903 in FIG. 15. When a route provided in the upper layer network (for example, a flow F701 in FIG. 15) includes at least one potential link, a lower layer route related to the potential link (for example, links L601 and L602 in FIG. 15) is set to the lower layer network.

By the network control device 1, the upper layer is able to previously convey a requirement of a desired resource (link) to the lower layer. By previously providing the lower layer with information required for design and preparation of a resource, the upper layer is always able to be supplied with the desired resource. Further, by collecting a requirement of a desired resource from each of a plurality of upper layers and integrating the requirements to design a path, the lower layer is able to optimize resource allocation. Further, by the network control device 1, the lower network side is able to be aware of a behavior tendency of resource use by the upper layer network, by monitoring generation and vanishing processes of potential links based on potential link requests provided by the upper layer. Consequently, a resource deployment plan based on the information can be made.

Next, referring to drawings, example embodiments of the present invention will be described in detail. The example embodiments of the present invention, to be described later, provide an upper layer network with potential link information satisfying a predesignated requirement, based on topology information about a lower layer network. The upper layer network calculates a path by using a topology obtained by adding potential link information provided by the lower layer to topology information about the upper layer. Consequently, design and setting of a path considering resource information that can be provided for the upper layer by the lower layer can be efficiently performed. The example embodiments of the present invention will be described in detail, while hereinafter simplifying "multilayer network control" to "multilayer control," and using a term "flow" synonymously with "path."

First Example Embodiment

A configuration and an operation of a control device controlling a two-layered multilayer network, according to a first example embodiment of the present invention, will be described in detail.

Configuration

Figure 2:
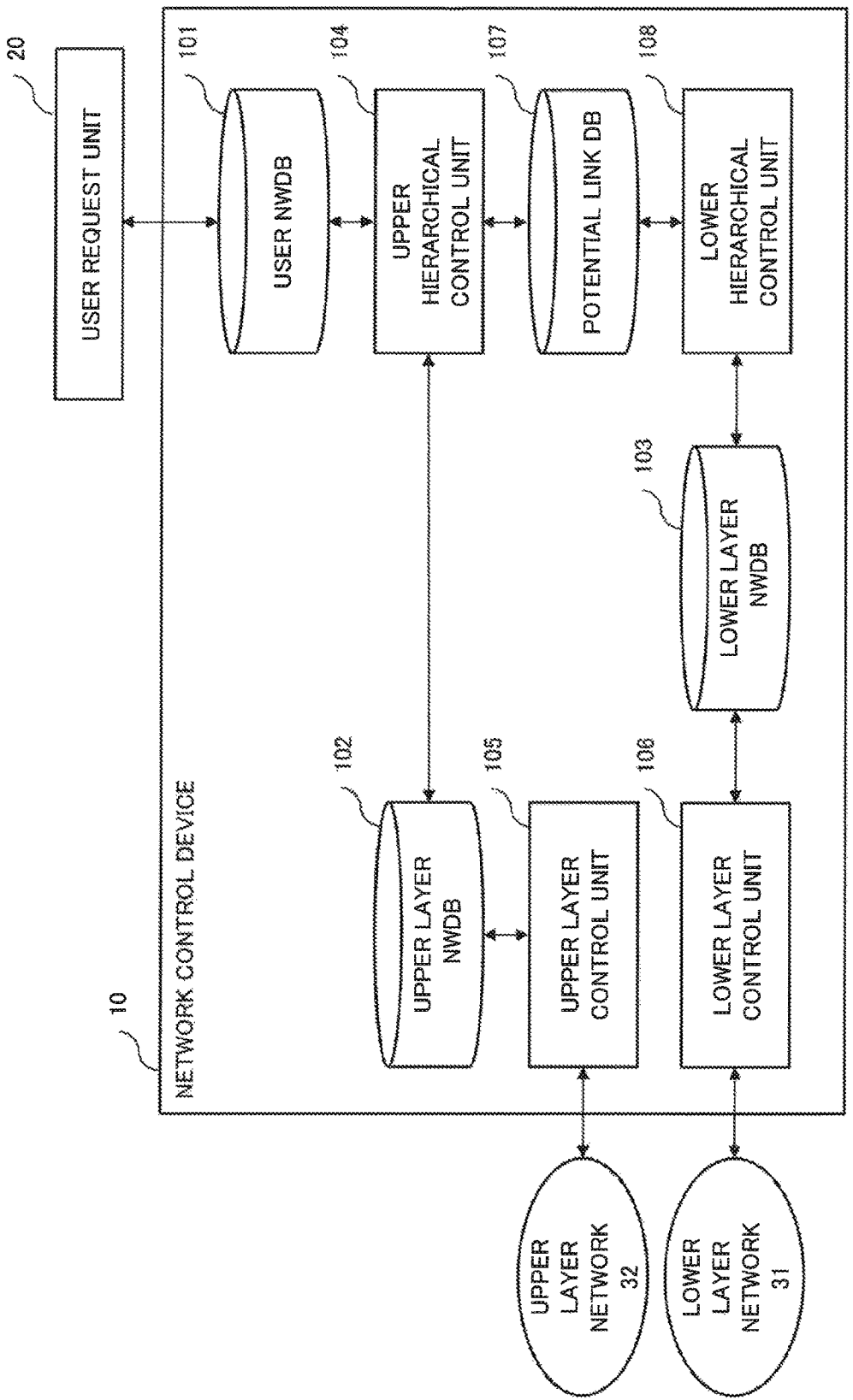
FIG. 2 is a block diagram exemplifying a configuration of a network control device according to a first example embodiment.

In FIG. 2, a network control device 10 according to the present example embodiment controls a lower layer network 31 and an upper layer network 32 in accordance with a flow request from a user request unit 20 by a user. The network control device 10 includes a user network database (NWDB) 101, an upper layer NWDB 102, a lower layer NWDB 103, an upper hierarchical control unit 104, a potential link DB 107, and a lower hierarchical control unit 108. Additionally, the network control device 10 includes an upper layer control unit 105 and a lower layer control unit 106. The upper layer control unit 105 and the lower layer control unit 106 control the upper layer network 32 and the lower layer network 31, respectively, in accordance with respective information changes in the upper layer NWDB 102 and the lower layer NWDB 103. In this case, a program or a group of programs executed on a computer playing a role described in a description below may be used in place of a user. Further, while a case of a single user being a target is hereinafter described, a plurality of users may exist.

The user NWDB 101 is accessed by the user request unit 20 and stores resource information available to a user. The upper layer NWDB 102 holds information about the upper layer network 32. Meanwhile, the lower layer NWDB 103 holds information about the lower layer network 31. Each network database holds network information including topology information that includes a node, a port, and a link, and flow (equivalent to path) information set thereto.

As will be described later, the lower hierarchical control unit 108 provides, through the potential link DB 107, the upper hierarchical control unit 104 with information about a link that can be potentially provided for the upper layer NW 32 by the lower layer NW 31 (potential link). Further, the lower hierarchical control unit 108 receives a potential link request and a potential link opening request from the upper hierarchical control unit 104 through the potential link DB 107.

As will be described later, the upper hierarchical control unit 104 provides the user request unit 20 with information about a potential link that can be provided for a user, based on a potential link obtained in the potential link DB 107 and topology information about the upper layer NW 32 stored in the upper layer NWDB 102. The information is provided through the user NWDB 101. Further, the upper hierarchical control unit 104 receives a potential link request and a potential link opening request from the user request unit 20 through the user NWDB 101.

Figure 3:
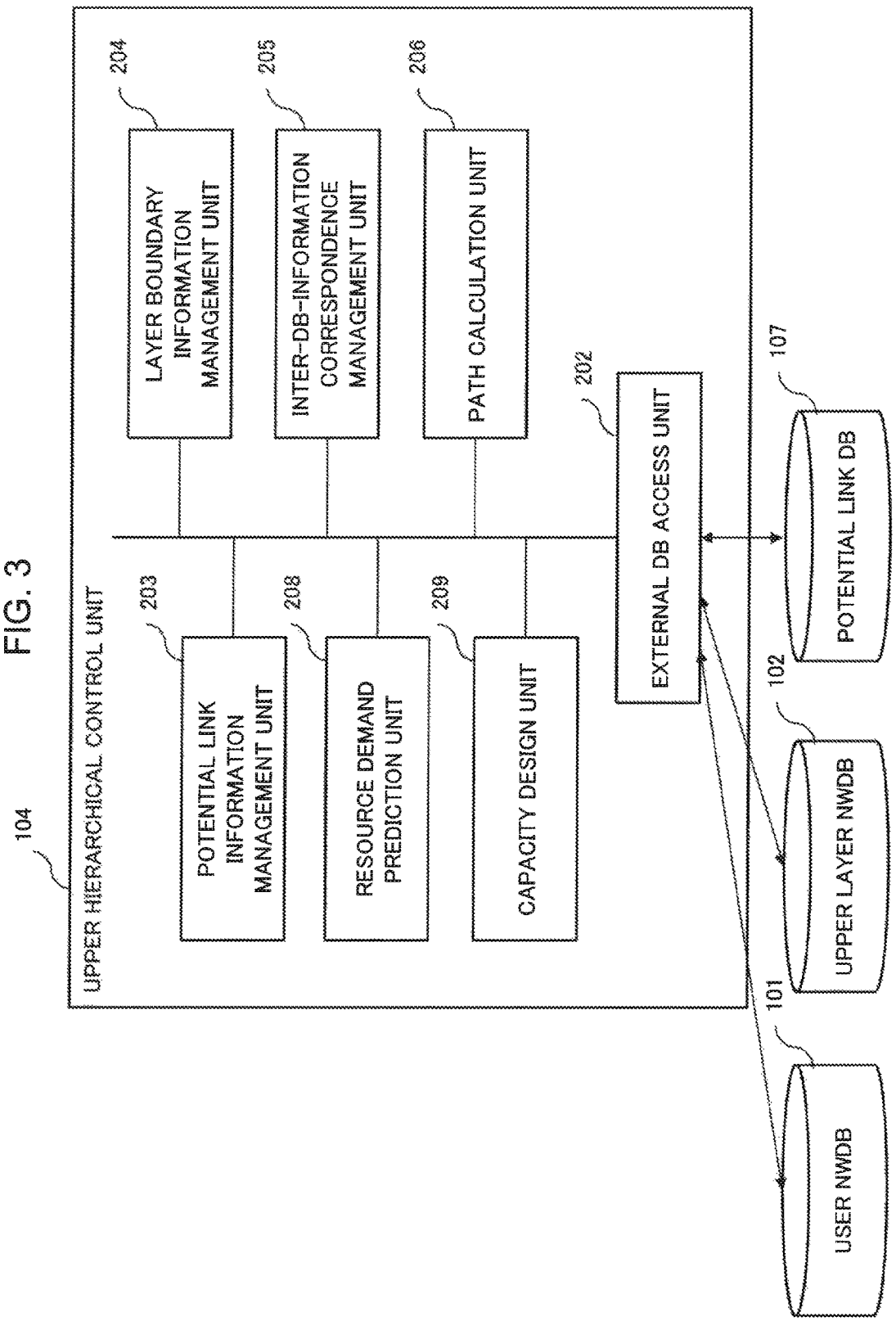
FIG. 3 is a block diagram exemplifying a configuration of a hierarchical control unit in the network control device according to the first example embodiment.

As illustrated in FIG. 3, the upper hierarchical control unit 104 performs access to, and acquisition or update of information in the user NWDB 101, the upper layer NWDB 102, and the potential link DB 107, being external databases, through an external database (DB) access unit 202. Additionally, the upper hierarchical control unit 104 includes a potential link information management unit 203, a layer boundary information management unit 204, an inter-DB-information correspondence management unit 205, a path calculation unit 206, a resource demand prediction unit 208, and a capacity design unit 209. The potential link information management unit 203 creates and manages potential link information and virtual port information in the user NWDB 101. The layer boundary information management unit 204 manages a layer boundary with each of the upper layer and the lower layer. The inter-DB-information correspondence management unit 205 manages correspondences between pieces of information stored in the user NWDB 101, the upper layer NWDB 102, and the potential link DB 107. The path calculation unit 206 performs route calculation, based on topology information in the network databases. The resource demand prediction unit 208 monitors and records a potential link request from the upper layer network and a use situation of a potential link, and, by using history information thereof, predicts an upper layer demand. The capacity design unit 209 estimates an amount and an allocation pattern of a required resource, based on a prediction result by the resource demand prediction unit 208.

Figure 4:
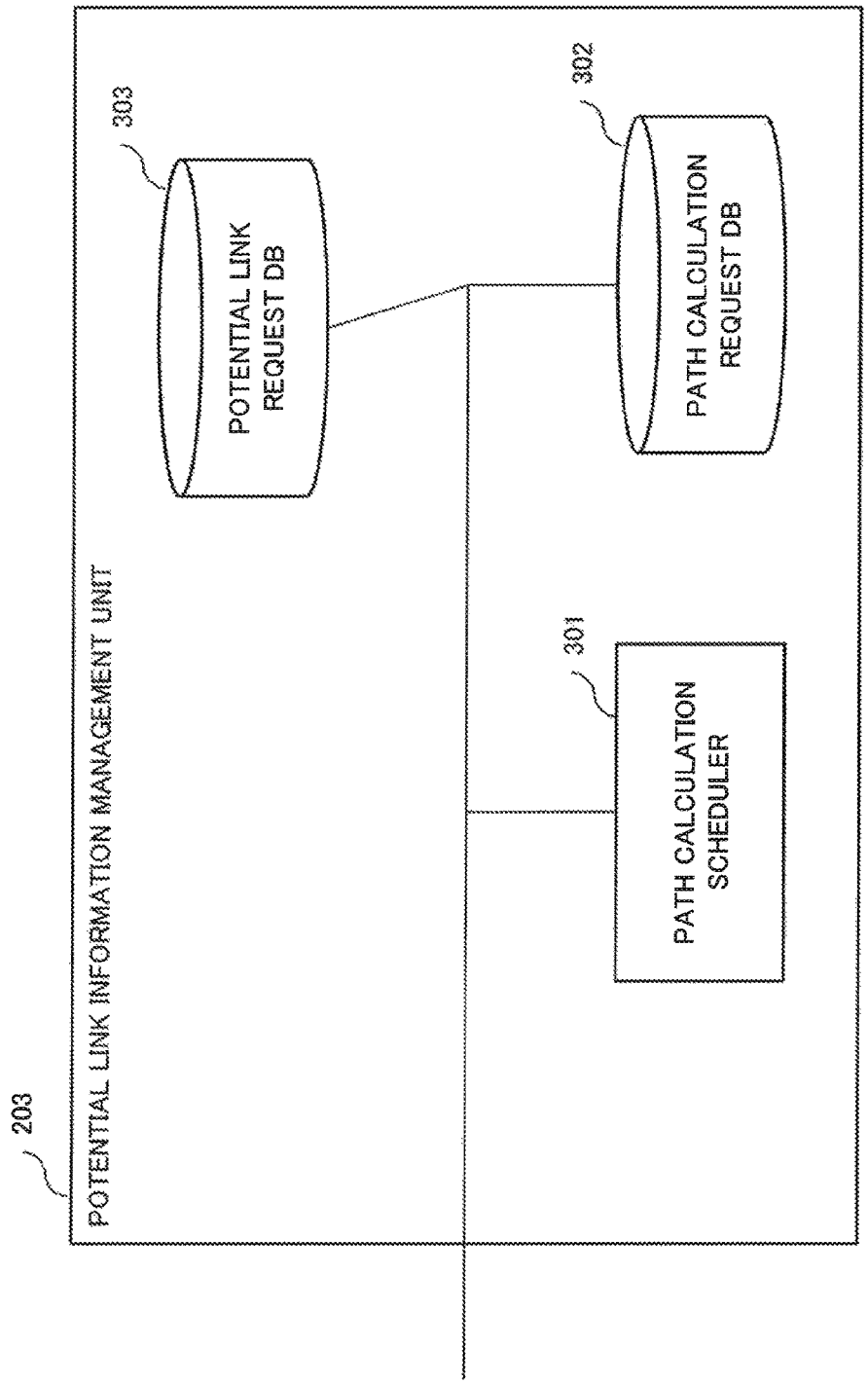
FIG. 4 is a block diagram exemplifying a configuration of a potential link information management unit in the network control device according to the first example embodiment.

As illustrated in FIG. 4, the potential link information management unit 203 includes a path calculation scheduler 301, a path calculation request database 302, and a potential link request database 303. The path calculation scheduler 301 manages a path calculation event. The path calculation request database 302 stores information about a potential link request. The potential link request database 303 holds a correspondence between a path calculated in response to a potential link request and the potential link.

The lower hierarchical control unit 108 is configured similarly to the upper hierarchical control unit 104 illustrated in FIG. 3.

However, the lower hierarchical control unit 108 accesses two databases, the lower layer NWDB 103 and the potential link DB 107, from the external DB access unit 202.

Note that a plurality of lower layer networks may exist for one upper layer network. In this case, the upper hierarchical control unit 104 is connected to a plurality of potential link DBs 107. However, for the sake of simplification, a case that one lower layer network exists will be described here.

Further, the upper hierarchical control unit 104 and the lower hierarchical control unit 108 may provide equivalent functions by executing, on a computer such as a central processing unit (CPU), a program stored in an unillustrated memory in the network control device 10. Referring to a multilayer network exemplified in FIG. 5, an operation of the network control device 10 according to the present example embodiment will be described below.

Figure 5:
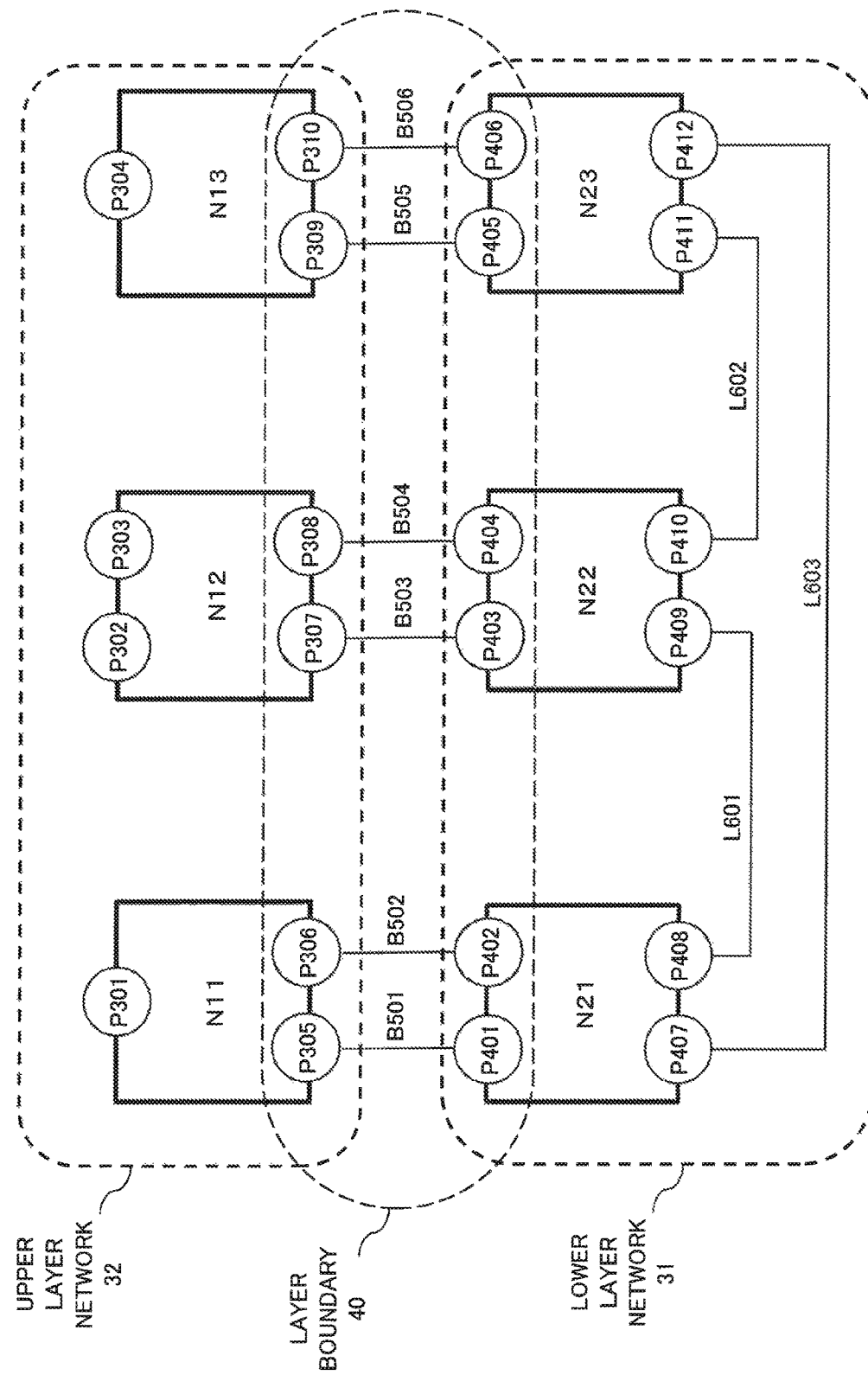
FIG. 5 is a diagram exemplifying a configuration of a multilayer network for illustrating an operation of the network control device according to the first example embodiment.

As illustrated in FIG. 5, it is assumed that the multilayer network includes the lower layer network 31, the upper layer network 32, and a layer boundary 40. Specifically, the upper layer network 32 includes nodes N11 to N13 and ports P301 to P310.

Meanwhile, the lower layer network 31 includes nodes N21 to N23, ports P401 to P412, and links L601 to L603.

Furthermore, the layer boundary 40 includes boundary connections B501 to B506. The boundary connections B501 to B506 are links connecting ports. The boundary connection B501 connects the ports P305 and P401. The boundary connection B502 connects the ports P306 and P402. The boundary connection B503 connects the ports P307 and P403. The boundary connection B504 connects the ports P308 and P404. The boundary connection B505 connects the ports P309 and P405. The boundary connection B506 connects the ports P310 and P406.

The upper layer control unit 105 and the lower layer control unit 106 in the network control device 10 acquire information about the upper layer network 32 in FIG. 5 and information about the lower layer network 31 in FIG. 5 from the respective networks. Additionally, it is assumed that the upper layer control unit 105 and the lower layer control unit 106 register information about a node, a port, and a link in the upper layer NWDB 102 and the lower layer NWDB 103, respectively. Further, it is assumed that information about the layer boundary 40 is previously recorded in the lower hierarchical control unit 108. Similarly, it is assumed that the upper hierarchical control unit 104 holds information about a layer boundary between the upper layer NW 32 and a user network.

Operation

Referring to FIG. 6 to FIG. 18, a potential link creation operation (for example, creation in the potential link DB 107) and a flow setting operation of the network control device 10 will be described in detail below.

Potential Link Creation Operation

Figure 6:
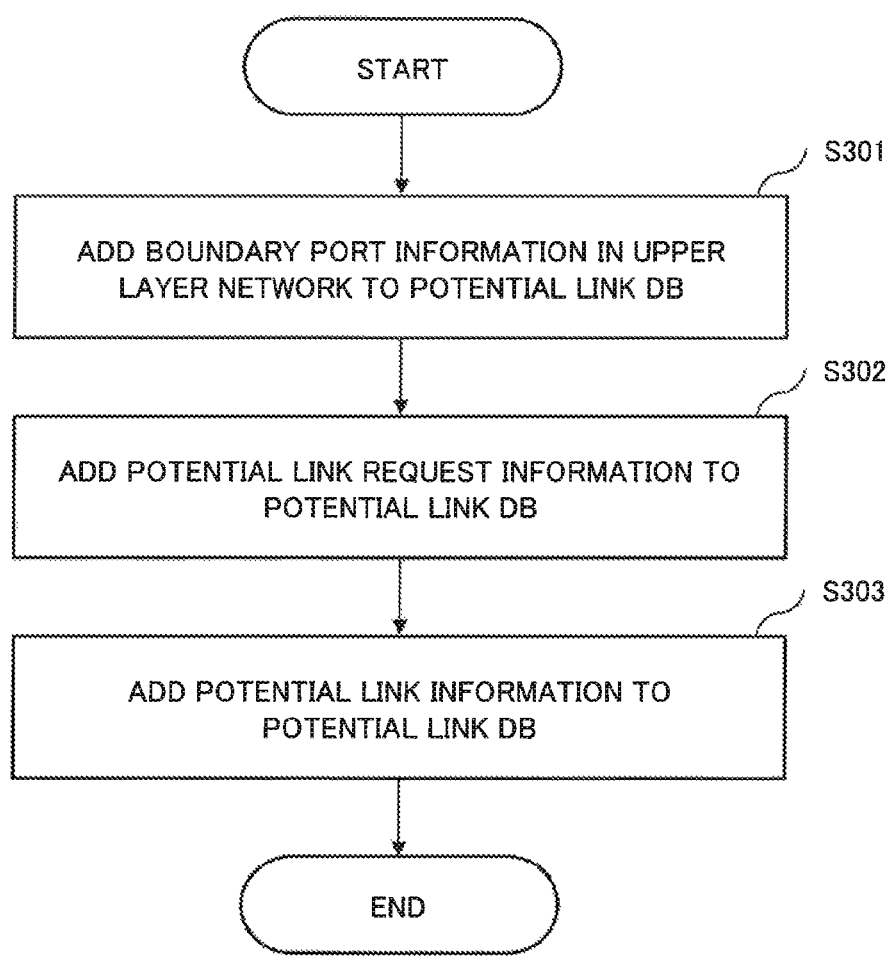
FIG. 6 is a flowchart exemplifying an operation of creating information held by a potential link database in the network control device according to the first example embodiment.

First, the potential link information management unit 203 in the lower hierarchical control unit 108 writes information about a boundary port in the upper layer network 32 into the potential link DB 107 through the external DB access unit 202, the boundary port being connected to the lower layer network 31 (Step S301 in FIG. 6). The information about the boundary port in the upper layer network is obtained from information held in the layer boundary information management unit 204 in the upper hierarchical control unit 104. The potential link information management unit 203 in the upper hierarchical control unit 104 acquires, through the external DB access unit 202, information about a port added to the potential link DB 107. The acquisition is performed by a callback or a message notification from the potential link DB 107 to or through the external DB access unit 202. Alternatively, the acquisition is performed by polling to the external DB access unit 202 or to the potential link DB 107 through the external DB access unit 202. The potential link information management unit 203 records information about the acquired port in the path calculation request database 302. Information about the ports added to the potential link DB 107 may represent physical ports or may be virtual ports abstracting physical ports. A virtual port may be associated with any physical port. Accordingly, connections between the upper layer network 32 and the lower layer network 31 can be represented by virtual ports the number of which being less than that of actual physical ports. Virtual ports will be used in the following description.

Next, the potential link information management unit 203 in the upper hierarchical control unit 104 adds a potential link request to the potential link DB 107 through the external DB access unit 202 (Step S302). The potential link request is associated with two virtual ports and describes a requirement related to a potential link that may connect the two virtual ports. A bandwidth, a delay, reliability, priority, and the like may be listed as examples of the requirement. A user also creates a virtual port required for creating a potential link request. At this time, the user designates at least a location of the virtual port, that is, a node the virtual port is associated with, and the number of the virtual port. The contents of the potential link request may be designated through an input interface (not illustrated in FIG. 3) to the layer boundary information management unit 204 in the upper hierarchical control unit 104. Further, a default request content to be referred to by the layer boundary information management unit 204 may be preset. Alternatively, as will be described later, information about a potential link request and a potential link that are stored in the user network DB 101 may be acquired, and a request content may be determined based on the information. The potential link information management unit 203 in the lower hierarchical control unit 108 acquires, through the external DB access unit 202, the potential link request added to the potential link DB 107. The acquisition is performed by a callback or a message notification from the potential link DB 107 to or through the external DB access unit 202. Alternatively, the acquisition is performed by polling to the potential link DB 107 by or through the external DB access unit 202. The potential link information management unit 203 in the lower hierarchical control unit 108 records the acquired potential link request in the path calculation request database 302.

Next, the potential link information management unit 203 in the lower hierarchical control unit 108 checks connectivity of a link connecting the created virtual ports, and creates a potential link (Step S303).

The path calculation scheduler 301 generates a path calculation request from the potential link request in the path calculation request database. At this time, each potential link request recorded in the path calculation request database in preceding Step is read as a request for a path connecting two virtual ports in accordance with a designated requirement. The path calculation requests may include a path calculation request related to a potential link request previously stored in the user NWDB 101 and the path calculation request database 302, in addition to a potential link request added in preceding Step. Each path calculation request includes information that can uniquely identify a related potential link request (for example, an identifier of a potential link request).

The path calculation scheduler 301 determines a time when path calculation is performed on the path calculation requests. The time may be immediately, or after a certain period of time elapses from the present time. When path calculation is performed after a certain period of time elapses from the present time, the elapsed time may be determined in a fixed or dynamic manner, based on a preprogrammed value, or a preset or predesignated value, or may be determined in consideration of loaded condition and the like of the network control device 10. Further, a time, a period of time, or information used for derivation thereof may be provided as a parameter of a potential link request created in Step S302, and the elapsed time may be determined based on the information.

The path calculation scheduler 301 passes a path calculation request to the path calculation unit 206 at a predetermined time.

The path calculation unit 206 performs path calculation on the path calculation request passed from the path calculation scheduler 301. The path calculation unit 206 performs path calculation in topology of the lower layer network 31, by using Constrained Shortest Path First (CSPF) and a heuristic method such as a genetic method, mathematical programming, or another path calculation algorithm. Further, the path calculation unit 206 checks connectivity of a potential link in path calculation. The connectivity check checks whether an upper layer port related to a virtual port designated as an endpoint of the potential link is physically connected to a lower layer port. The check is performed by referring to information recorded in the layer boundary information management unit 204.

For example, the nodes N11 and N12 in FIG. 5 can be connected. The port P305 or P306 on the node N11 is connected to the port P401 or P402 on the node N21 through the boundary connection B501 or B502. Similarly, the node N12 is connected to the node N22 through the boundary connection B503 or B504. At this time, when a path can be set between the node N21 and the node N22, a potential link can be set between the nodes N11 and N12.

Note that "physically connected" literally means physically connected. In a case that upper and lower layer ports are physically connected with one or more switchable devices such as switches in between, even when the two ports are not short-circuited in the devices, the ports are determined connectable as long as the two ports can be short-circuited by switching control of the devices.

The path calculation unit 206 passes the path calculation result to the potential link information management unit 203. Each path calculation result includes information that can uniquely identify a related path calculation request or a potential link request related to the path calculation request. The potential link information management unit 203 checks the path calculation result received from the path calculation unit 206 against the potential link request in the path calculation request database 302. Further, the potential link information management unit 203 creates potential link information related to the potential link request, and stores a combination of the potential link information and the path calculation result into the potential link request database 303. The potential link information includes a specification (performance such as a bandwidth, a delay, reliability, and priority) of a link when connecting the virtual ports designated by the potential link request by the path designated by the potential link request, in addition to information that can uniquely identify the potential link request. The specification value may use the path specification as is, or may use a value obtained by processing the path specification (for example, decreasing a bandwidth value from the bandwidth of the path, or, increasing a delay value from the delay of the path). With respect to a potential link for which a path is not discovered by the path calculation unit 206, the potential link information management unit 203 stores the potential link into the potential link request database 303 along with information to the effect that a path does not exist, in place of path information, or does not store the potential link. Thus, nonexistence of the potential link may be represented.

Next, in order to add the potential link information to the potential link DB 107, the path calculation scheduler 301 or the potential link request database 303 notifies the potential link information to the potential link DB 107 through the external DB access unit 202 (Step S303). The notification includes the potential link specification and information that can uniquely identify the related potential link request.

The potential link is recorded in the potential link DB 107 as a link connecting the virtual ports provided in Step S301. However, unlike a normal link, the potential link is a link not actually set, and therefore the potential link information or the potential link DB 107 includes information for distinguishing a difference between the two.

Figure 7:
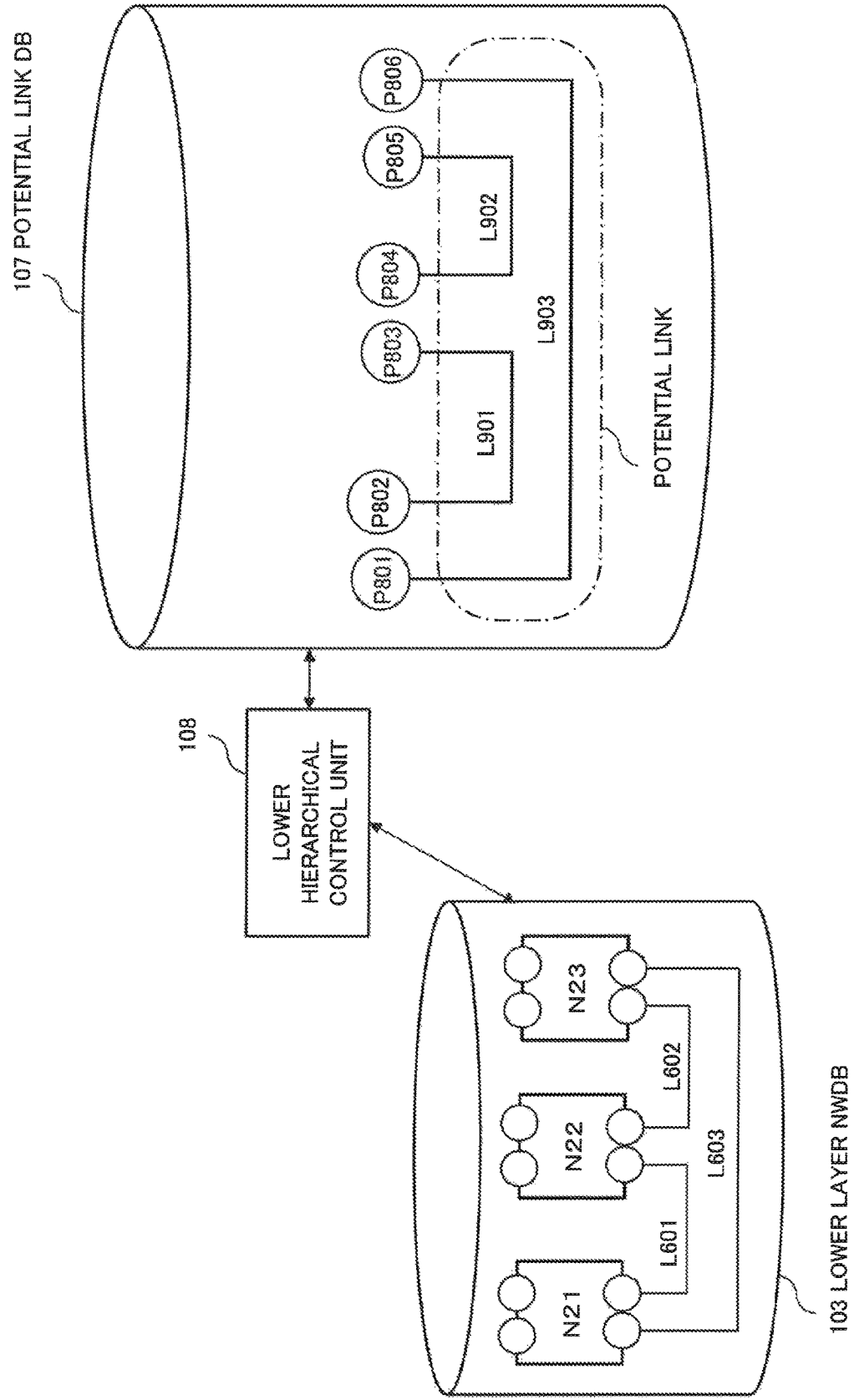
FIG. 7 is a diagram for illustrating information held by each network database after creating potential link database information as illustrated in FIG. 6.

From the description above, for example, FIG. 7 illustrates information stored in the potential link DB 107 when there is a full-mesh-like potential link request between the three nodes N11, N12, and N13 in the multilayer network illustrated in FIG. 5 from the upper hierarchical control unit 104. Specifically, the lower hierarchical control unit 108 stores information about potential links that can be connected between boundary ports in the upper layer into the potential link DB 107. In this case, the potential link DB 107 stores virtual ports P801 to P806 related to the physical boundary ports on the nodes N11 to N13, and the potential links L901 to L903 indicated by a box in a dotted line. FIG. 8 illustrates a specific data structure of the potential link DB 107 in the multilayer network in FIG. 5.

As illustrated in FIG. 8, topology information including port information 107B and link information 107C is registered in the potential link DB 107. "Assigned" in the port information 107B is information indicating whether a port is a "virtual port," and TRUE indicates a real port rather than a virtual port, and FALSE indicates a virtual port. "Established" in the link information 107C is information indicating whether a link is a potential link, and TRUE indicates a set link for which a flow is actually set to the lower layer network, and FALSE indicates a potential link. Further, a sum of a link delay on a route calculated at creation of each potential link by the lower hierarchical control unit 108 is registered as metric information in "Delay" of a link. In other words, "Delay" indicates a link delay generated when setting a lower layer flow to the section to create a link.

Figure 9:
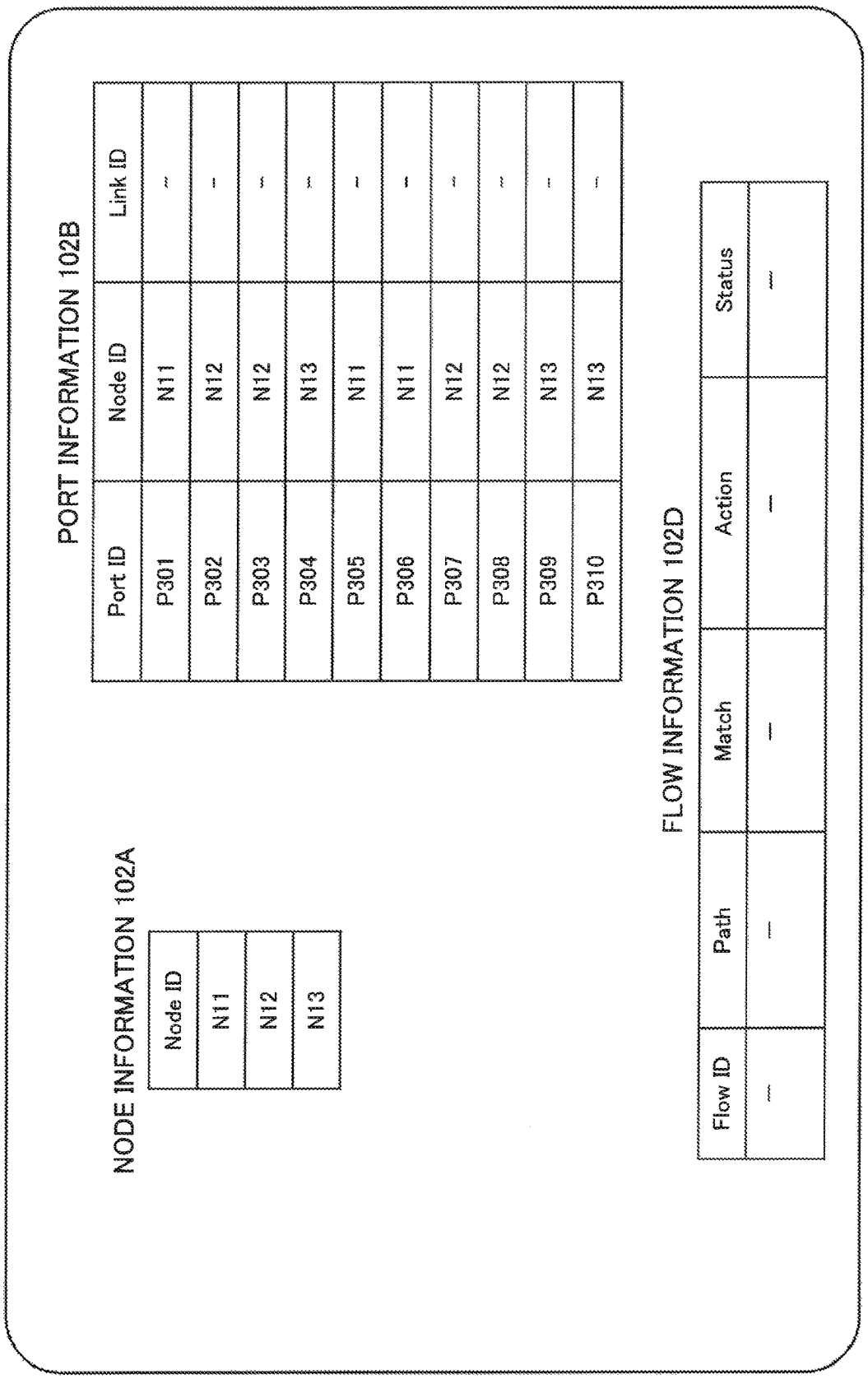
FIG. 9 is a diagram exemplifying a data structure of an upper layer network database after creating potential link database information as illustrated in FIG. 6.

FIGS. 9 and 10 illustrate the upper layer network DB 102 and the lower layer network DB 103, respectively, at creation of the potential link DB 107. Since a flow does not exist in the lower layer network, a link does not exist in the upper layer NWDB 102 illustrated in FIG. 9, and only node information 102A and port information 102B are registered therein. However, depending on a network configuration, a link connecting ports that are not in layer boundaries may be registered. In this case, the information including the link is copied to the user NWDB.

Topology information including node information 103A, port information 103B, and link information 103C is registered in the lower layer NWDB 103 illustrated in FIG. 10. For example, delay information ("Delay") in the link information 103C is a propagation delay based on a physical distance of a link, and is registered by the lower layer control unit 106. While no flow is registered in the lower layer NWDB 103, there may be a case that a flow is registered depending on an initial state of the network. In this case, a potential link creation operation is performed after a set link related to each flow is created.

FIG. 11 illustrates a data structure of the layer boundary 40 held by the layer boundary information management unit 204 in the lower hierarchical control unit 108.

Information about a node, a port, a link, and a flow in each network database is not limited to the description above. For example, each port may be added with information about a maximum bandwidth, a remaining bandwidth, and a bandwidth secured for a flow, or may be added with cost information for route calculation as metric information other than a link delay. Further, for example, when a controlled network is an optical layer network, a port may be added with available resource information and unused resource information. The resource information relates to a wavelength in a WDM layer, a time slot in a TDM layer, and flow identification information in a header in a packet-switching-based layer (for example, a label in a shim header in MPLS, a virtual local area network (VLAN) identifier (VID) in a VLAN, and a combination of tuples that can be matched in OpenFlow).

Flow Setting Operation

Next, referring to FIGS. 12 to 18, an operation of the network control device 10 when a flow is added to the user NWDB 101 will be described with configurations in FIGS. 5 and 7 as examples.

Figure 12:
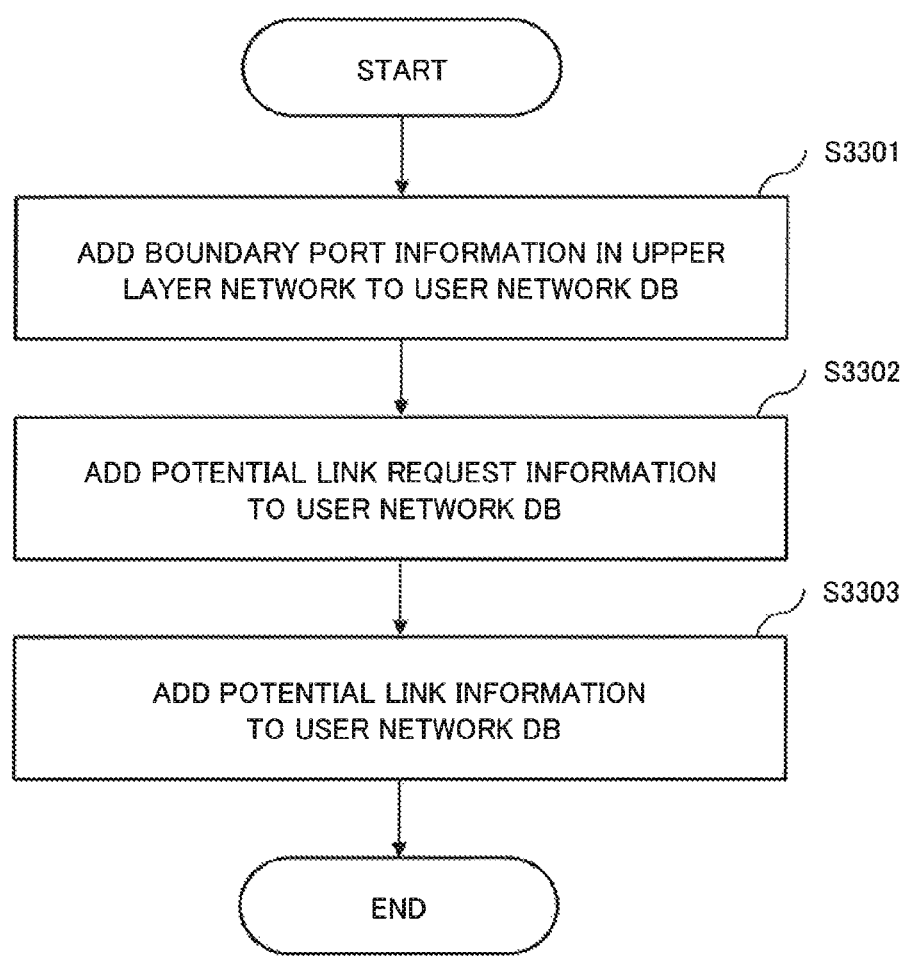
FIG. 12 is a flowchart exemplifying a creation operation of user NWDB information by the network control device according to the first example embodiment.

First, the user request unit 20 and the upper hierarchical control unit 104 request and provide potential link information that can be provided for a user by the upper layer network 32, through the user network DB 101, by processing similar to FIG. 6 (FIG. 12). Note that the path calculation unit 206 in the upper hierarchical control unit 104 performs path calculation in composite topology obtained by providing, as a link, a potential link stored in the potential link DB 107 for topology stored in the upper layer network DB102.

In this case, as an example, it is assumed that a user uses ports connected to the nodes N11 and N13, and a potential link with a minimum delay between the two ports is requested. FIG. 7 illustrates two routes as candidate routes of a flow from the node N11 to the node N13 in the upper hierarchical control unit 104. Specifically, the candidate routes include a first route (total delay: 200 msec) routed through the links L901 (delay: 100 msec) and L902 (delay: 100 msec), and a second route (total delay: 300 msec) routed through the link L903 (delay: 300 msec). In this case, the first route has a smaller delay, and therefore a potential link (referred to as X) based on the first route (L901 and L902) is created.

Next, as illustrated in FIG. 13, the user request unit 20 selects a potential link to be used out of potential links stored in the user network DB 101, and adds a flow related to the potential link to the user network DB 101 (Step S401). At this time, "Status" in flow information 101D in the user NWDB 101 illustrated in FIG. 13 is set to "setting in progress." The potential link information management unit 203 in the upper hierarchical control unit 104 detects the update in the user network DB 101 by a callback or a message notification from the user network DB 101 to or through the external DB access unit 202. Alternatively, the potential link information management unit 203 detects the update by polling to the external DB access unit 202 or to the user network DB 101 through the external DB access unit 202.

The upper hierarchical control unit 104 receiving a flow setting request from the user request unit 20 starts flow setting processing for setting a potential link X used by the flow. First, the upper hierarchical control unit 104 determines whether a potential link related to the designated flow is provided only by the upper layer network 32 (Step S402). The route related to the potential link X cited as an example, in the upper layer network, is the L901 and L902 (Yes in Step S402). Accordingly, in order to set a flow passing each potential link, the upper hierarchical control unit 104 registers the flow in the potential link DB 107 (Step S403). The flow F701 in the potential link DB 107 is schematically illustrated in FIG. 15. At this time, "Status" in the flow information 107D in the potential link DB 107 illustrated in FIG. 16 is set to "setting in progress."

Figure 18:
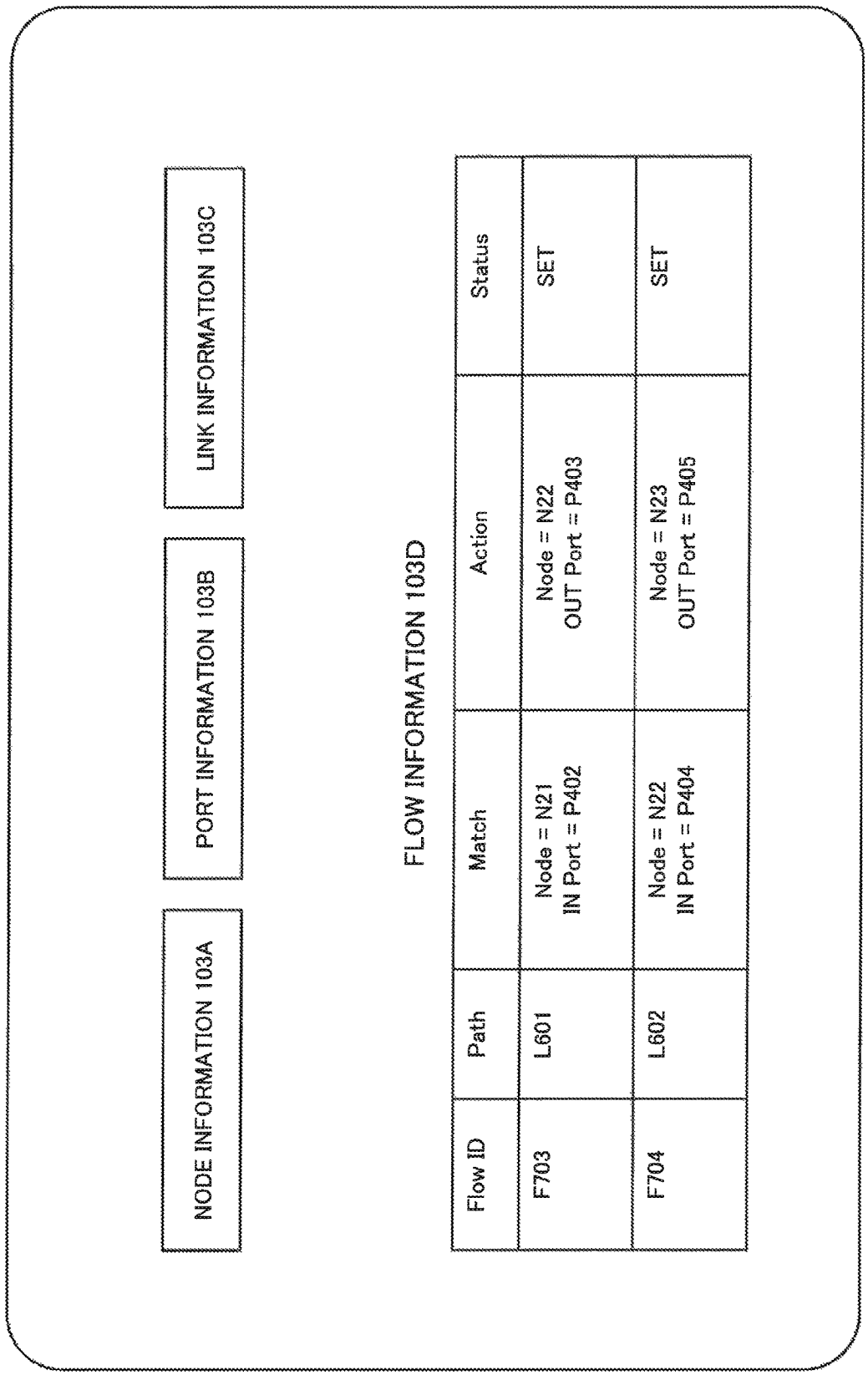
FIG. 18 is a diagram exemplifying a data structure of the lower layer network database after setting a flow as illustrated in FIG. 14.

The lower hierarchical control unit 108 receiving a flow setting request from the upper hierarchical control unit 104 starts processing for setting a potential link used by the flow. When flows F901 and F902 are registered in the potential link DB 107, the potential link information management unit 203 in the lower hierarchical control unit 108 sets the potential links L901 and L902 related to the flows F901 and F902 as actual links. For the setting, the lower layer control unit 106 sets flows F703 and F704 constituting the two potential links (Step S404). When the flow setting is completed, the lower layer control unit 106 changes "Status" of the flow F703 in the lower layer NWDB 103 to "set" as illustrated in FIG. 18.

When the flow setting by the lower layer control unit 106 is completed, the lower hierarchical control unit 108 changes the potential link L901 in the potential link DB 107 related to the set flow F703 to "set" (Step S405). Specifically, as illustrated in FIG. 16, "Established" (set) for the potential link L901 is changed to "TRUE." Further, association of endpoints of the potential link L901, the virtual ports P802 and P803, with ports in the upper layer NWDB 102 is performed at the same time. The endpoint ports of the flow F703 in the lower layer NWDB 103 are the port P402 on the node N21 and the port P403 on the node N22. Consequently, by referring to the layer boundary information illustrated in FIG. 11, ports in the upper layer network 32 that are related to the ports are identified as the ports P306 and P307, respectively. Accordingly, the inter-DB-information correspondence management unit 205 in the lower hierarchical control unit 108 relates the port P306 on the node N11 in the upper layer network DB 102 to the virtual port P802 in the potential link DB 107. The inter-DB-information correspondence management unit 205 further relates the port P307 on the node N12 in the upper layer network DB 102 to the virtual port P803 in the potential link DB 107, and holds correspondences between the ports. As illustrated in FIG. 16, the potential link information management unit 203 in the lower hierarchical control unit 108 changes "Assigned" for the virtual ports P802 and P803 in the port information 107B in the potential link DB 107 to "TRUE," respectively.

Next, the upper hierarchical control unit 104 registers the link in the potential link DB 107, being changed to "set" in preceding Step, in the upper layer network DB 102 as a link (Step S406). Specifically, the hierarchical control unit 104 registers a link L001 related to the link L901 in the user NWDB 101, between the ports P306 and P307 in the upper layer NWDB 102, based on the previously held inter-DB-information correspondence. At that time, another type of information about the link such as a delay is also copied.

Further, the inter-DB-information correspondence management unit 205 also holds a correspondence between the link L901 in the user NWDB 101 and the link L001 in the upper layer NWDB 102 as an inter-DB-information correspondence.

Further, the lower hierarchical control unit 108 recalculates a potential link (Step S407). Specifically, a layer boundary port used by the previous link and flow setting, on the nodes in the upper layer network 32, is excluded, and then the processing in FIG. 6 is performed.

The upper hierarchical control unit 104 performs Steps S403 to S407 described above on every potential link through which the first flow registered in the user NWDB 101 passes (Step S408). As described above, processing on the potential link L901 out of the two potential links L901 and L902 that are included in the flow F701 is completed, but the potential link L902 still remains (No in Step S408). Accordingly, the upper hierarchical control unit 104 performs Steps S403 to S407 described above on the potential link L902.

When path setting is completed for every potential link (Yes in Step S408), or a potential link is not included in the route of the flow F701 (No in Step S402), a flow is set to the upper layer network 32 (Step S410). In Step S410, the upper layer control unit 105 actually sets a flow to each network device in the upper layer network 32 in accordance with the registered information about the flow F701. When the setting is completed, the upper layer control unit 105 changes the "Status" information of the flow F702 in the upper layer NWDB 102 to "set" as illustrated in FIG. 17. When detecting the change, the upper hierarchical control unit 104 changes "Status" of the flow F701 in the user NWDB 101 to "set" as illustrated in FIG. 13. The user request unit 20 is able to become aware of the flow setting completion by the flow information change in the user NWDB 101.

Through the operation described above, the upper hierarchical control unit 104 performs required flow setting on the lower layer network 31 and the upper layer network 32 as illustrated in FIG. 15. As described above, the data structures of the potential link DB 107, the upper layer NWDB 102, and the lower layer NWDB 103 that are illustrated in FIG. 15 are exemplified in FIGS. 16, 17, and 18, respectively.

In the potential link DB 107 illustrated in FIG. 16, the flow information 107D is added in addition to the topology information (107B, and 107C). Further, "Established" information of a set link is set to "TRUE," and "Assigned" information of a port associated with a port in the upper layer network is set to "TRUE." Thus, when a flow is added to the potential link DB 107, the network control device 10 performs required setting on the lower layer network 31 and the upper layer network 32, respectively.

In the upper layer NWDB 102 illustrated in FIG. 17, links L001 and L002 are added as a result of a flow being set to the lower layer network 31. Further, information about the set flow is also added.

In the lower layer NWDB 103 illustrated in FIG. 18, flow information 103D is added in addition to the topology information (103A, 103B, and 103C). "Path" holds route information about the flow in a form of a list of a link through which the flow is routed. Further, "Match" holds information about a node and a port at the input side endpoint of the flow. Additionally, "Action" holds information about a node and a port at the output side endpoint of the flow.

Resource Demand Prediction

Figure 14:
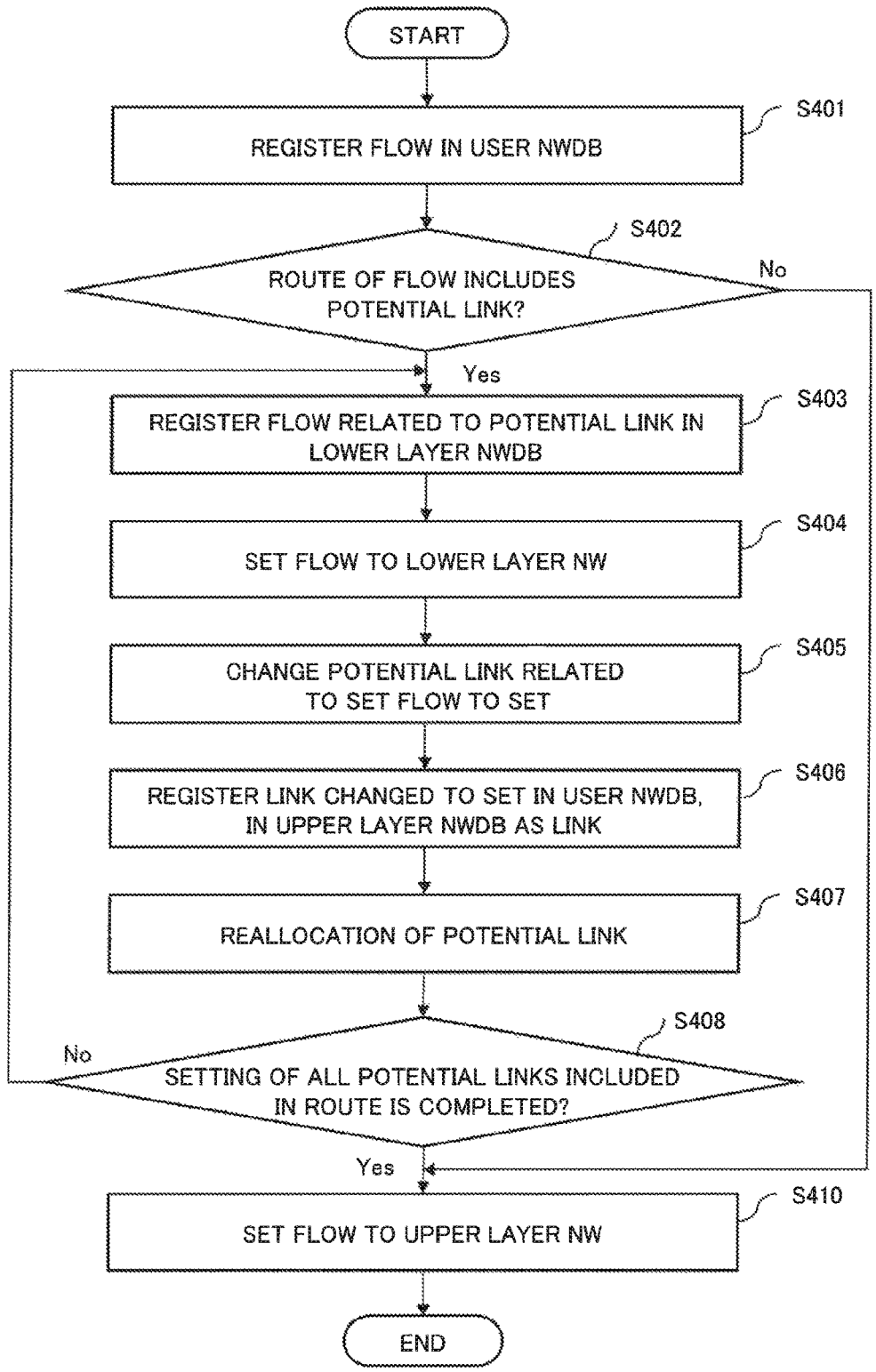
FIG. 14 is a flowchart exemplifying a flow setting operation by the network control device according to the first example embodiment.

The resource demand prediction unit 208 in the upper hierarchical control unit 104 monitors information about a potential link set as a link through the operation in Steps S402 to S408 in the flowchart in FIG. 14. The information may be known by performing polling to the user NWDB 101 with respect to potential link information in the user NWDB 101 or receiving a change notification from the user NWDB 101.

The resource demand prediction unit 208 records variations of a number, specifications, a distribution, and the like of potential link requests, being obtained by the monitoring, and predicts a future demand, based on a history thereof. The prediction result is obtained as a number, specifications, and a distribution of potential link requests.

Based on a number, specifications, and a distribution of potential link requests predicted by the resource demand prediction unit 208, the capacity design unit 209 calculates an amount and a distribution of a resource required for supplying connectable potential links for the potential link requests. The calculation is performed in consideration of an in-use or available resource originating in a link existing in the upper layer NWDB 102 and a potential link recorded in the potential link DB 107. When potential links related to the predicted potential link request cannot be provided solely by a current resource, the capacity design unit 209 calculates an amount and an allocation of an additionally required resource. Further, based on information about the amount and the allocation of the additionally required resource, the capacity design unit 209 generates a related potential link request, newly registers the request in the potential link DB 107, and receives additional supply of a potential link from the lower layer.

The resource demand prediction and the capacity design described above may be similarly performed in the lower hierarchical control unit 108. However, when the lower layer network 31 is a network located in the physically lowest layer, such as a WDM network, additional deployment of a resource calculated by the capacity design unit 209 entails physical equipment addition.

Further, when the number of boundary ports for securing a resource amount calculated by the capacity design unit 209 falls short in both the upper hierarchical control unit 104 and the lower hierarchical control unit 108, the resource is supplemented by physical equipment addition.

Effect

As described above, the first example embodiment stores information about a potential link including a specification such as performance into the user NWDB 101 and the potential link DB. Even in a state that a flow is not yet set in a lower layer and a link does not exist in an upper layer, a path meeting a flow requirement may be designed and set in the upper layer on the assumption that a desired link is supplied, by previously notifying the requirement to the lower layer. Further, the lower network side is able to be aware of a behavior tendency of resource use by the upper layer network, by monitoring generation and vanishing processes of potential links based on potential link requests provided by the upper layer. Consequently, a resource deployment plan can be made based on the information.

Second Example Embodiment

A network control device according to a second example embodiment of the present invention has a configuration similar to that of the network control device according to the first example embodiment. A difference in operation between the present example embodiment and the first example embodiment will be described.

Operation

Figure 19:
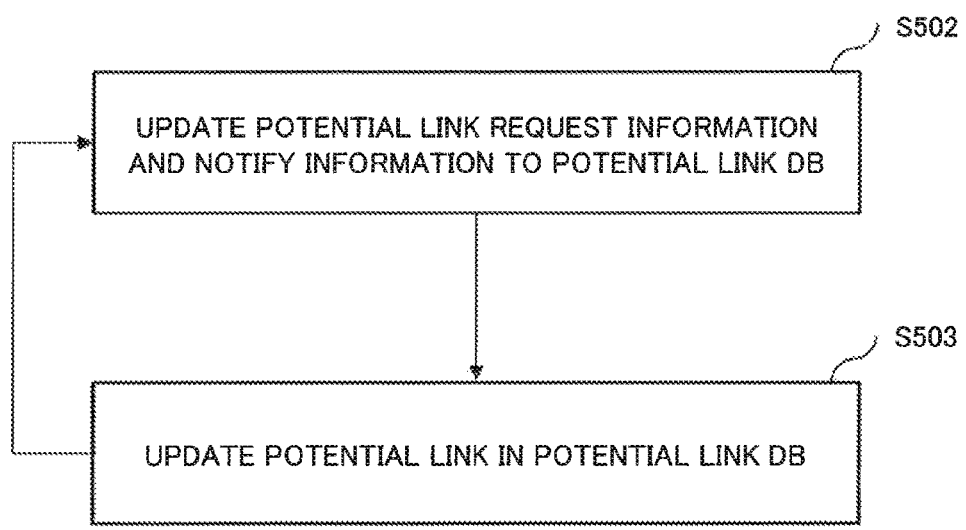
FIG. 19 is a flowchart exemplifying a potential link update operation of a network control device according to a second example embodiment.

The network control device according to the second example embodiment performs an operation illustrated in FIG. 19, in addition to the operation described in the first example embodiment.

The potential link information management unit 203 in the upper hierarchical control unit 104 periodically updates potential link request information (Step S502). Processing performed in Step S502 is equivalent to the processing in Step S302 according to the first example embodiment.

The potential link information management unit 203 notifies most recent potential link request information to the potential link DB 107 (Step S503). Processing performed in Step S503 is equivalent to the processing in Step S303 according to the first example embodiment.

Time intervals at which these Steps are repeatedly performed are determined by the path calculation scheduler 301. The time interval may be determined in a fixed or dynamic manner, based on a preprogrammed value, or a preset or predesignated value, or may be determined in consideration of loaded condition and the like of the network control device 10. Further, a time, a period of time, or information used for derivation thereof may be provided as a parameter of a potential link request created in Step S502, and the time interval may be determined based on the information.

Furthermore, an update of potential link request information by the potential link information management unit 203 in the upper hierarchical control unit 104 may be synchronized with an update of potential link request information in the user NWDB 101 by a user. Specifically, similarly to Step S502, when a user updates potential link request information and makes a notification to the user NWDB 101, similarly to Step S503, the upper hierarchical control unit 104 recalculates and updates a potential link in the user NWDB 101. When a route associated with the potential link consequently changes in the user NWDB 101, the upper hierarchical control unit 104 changes a potential link request to the lower layer, in order to secure an additional resource or to release a surplus resource (Step S502).

Effect

The second example embodiment of the present invention is able to continue updating potential link information recorded in the potential link DB 107. Consequently, the effect according to the first example embodiment can be sustained.

Third Example Embodiment

A network control device according to a third example embodiment of the present invention has a configuration similar to the configurations of the network control devices according to the first and second example embodiments. A difference in operation between the present example embodiment and the first and second example embodiments will be described.

Operation

Figure 20:
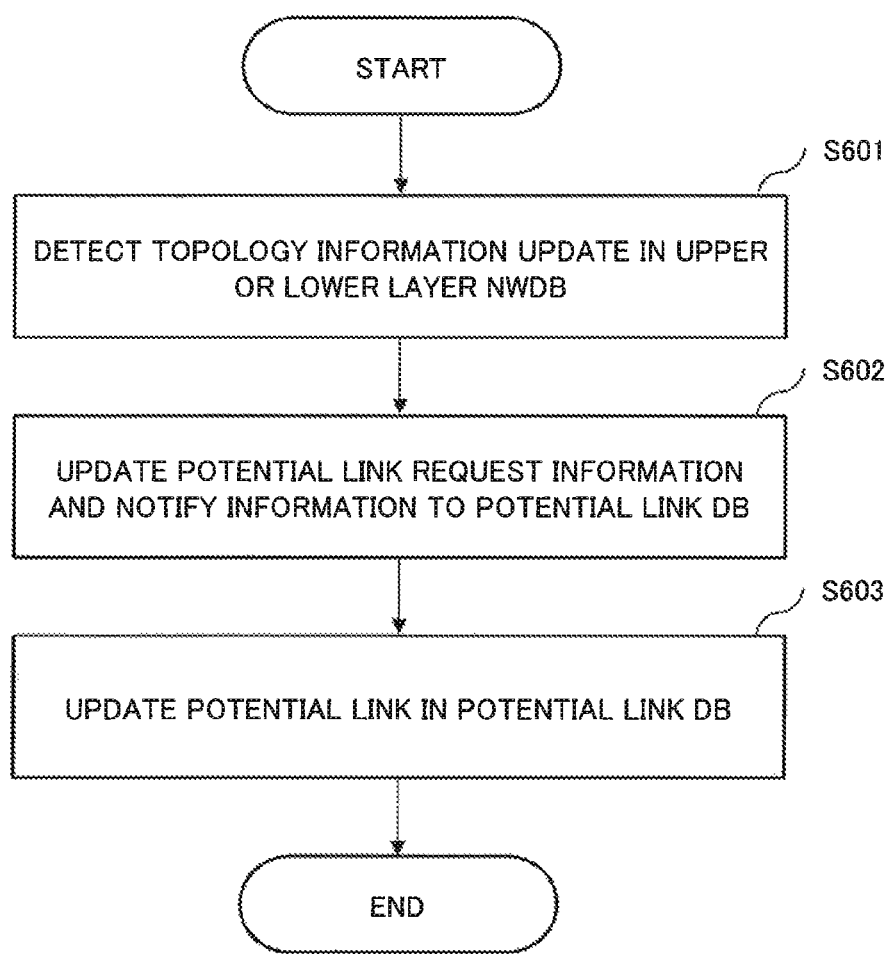
FIG. 20 is a flowchart exemplifying a potential link update operation of a network control device according to a third example embodiment.

Referring to a flowchart in FIG. 20, an operation of the third example embodiment will be described. The potential link information management unit 203 detects a state change in either layer of the network being the upper layer network 32 or the lower layer network 31, through the upper layer NWDB 102 or the lower layer NWDB 103 (Step S601).

The detection is performed by a callback or a message notification from the upper layer NWDB 102 or the lower layer NWDB 103 to the external DB access unit 202. Alternatively, the detection is performed by polling to the upper layer NWDB 102 or the lower layer NWDB 103 by the external DB access unit 202.

Next, the potential link information management unit 203 updates potential link request information and notifies most recent potential link request information to the potential link DB 107 (Step S602). Processing performed in Step S602 is equivalent to the processing in Step S502 according to the second example embodiment.

Next, a potential link in the potential link DB 107 is updated by the potential link notified by the potential link information management unit 203 (Step S603). Processing performed in Step S603 is equivalent to the processing in Step S503 according to the second example embodiment.

Effect

The third example embodiment of the present invention is able to immediately update potential link information recorded in the potential link DB 107, in accordance with a state change of the upper layer network 32 or the lower layer network 31 not caused by the network control device 10. Consequently, connectivity of a potential link recorded in the potential link DB 107 can be maintained. The cause other than the network control device 10 includes a failure, control from another system, setting change, and equipment work.

Fourth Example Embodiment

A network control device according to a fourth example embodiment of the present invention has a configuration similar to the configurations of the network control devices according to the first to third example embodiments. A difference in operation between the present example embodiment and the first to third example embodiments will be described.

Operation

According to the fourth example embodiment of the present invention, a user is able to update a potential link request in the potential link DB 107 through the user request unit 20 at any timing. Consequently, potential link request information in the potential link DB 107 is updated. The potential link information management unit 203 detects the update through an operation similar to Step S302 according to the first example embodiment, updates potential link information through an operation similar to Step S502 according to the second example embodiment, and notifies most recent potential link information to the potential link DB 107. The potential link DB 107 is updated by the notified most recent potential link information through an operation similar to Step S503 according to the second example embodiment.

When a user adds a potential link request, the user adds the potential link request to the potential link DB 107 through the user request unit 20 at any timing. An operation after the potential link request is added follows the operation according to the first example embodiment.

When a user deletes a potential link request, the user deletes the potential link request from the potential link DB 107 through the user request unit 20 at any timing. An operation after the potential link request is deleted follows the operation in and after Step S602 according to the third example embodiment. Alternatively, the user NWDB 101 may manage the potential link request by soft state. Specifically, the user NWDB 101 holds a timer for each potential link request and, when a predetermined time elapses from the start of a timer, deletes the potential link information. When an identical potential link request or an update to the identical request is made by the user before the predetermined time elapses from the start of the timer, the timer is reset.

Effect

The fourth example embodiment of the present invention enables a user to always convey a change of request with respect to a potential link to the network control device 10 through the potential link DB 107.

Consequently, the user is always able to be supplied with a desired potential link.

Modified Example

As a message including a potential link request or a message notifying a generated potential link (for example, from a lower layer to an upper layer), according to the example embodiment described above, a path computation element communication protocol (PCEP) message in which a predetermined value is set to a predetermined field may be used.

Further, while a case that a number of an upper layer network and a number of a lower layer network are respectively one, according to the aforementioned example embodiment, has been described for simplification of description, at least one of the layers may have more than one networks.

Furthermore, when a plurality of upper layers exist, a storage means holding a policy related to disclosure of a potential link to each upper layer may be provided. At this time, input to path calculation and/or potential link information notified to each upper layer is changed in accordance with the policy. Such a configuration enables flexible control of the respective plurality of upper layers in accordance with the policy.

Application Example

For example, the present invention is applicable to a service by which a carrier promptly provides a virtual network for a user on an on-demand basis. Specifically, the present invention is applicable to a network control part of a virtual private network (VPN) service connecting base networks of a user, and a cloud service connecting a data center and a user base, or data centers, and the like.

The example embodiments of the present invention may also be described as the following supplementary notes but are not limited thereto.

Supplementary Note 1

The same as the network control device according to the aforementioned first aspect.

Supplementary Note 2

The network control device according to supplementary note 1, wherein performance of the settable lower virtual link includes at least one of a bandwidth, a delay, reliability, and priority of the settable lower virtual link.

Supplementary Note 3

The network control device according to supplementary note 1 or 2, wherein the lower hierarchical control unit obtains the settable lower virtual link and performance of the settable lower virtual link, based on topology information about a layer boundary between the upper layer network and the lower layer network, and topology information about the lower layer network.

Supplementary Note 4

The network control device according to any one of supplementary notes 1 to 3, wherein the upper hierarchical control unit obtains a route of the flow, based on topology information about the upper layer network, and the settable lower virtual link.

Supplementary Note 5

The network control device according to any one of supplementary notes 1 to 4, wherein the lower hierarchical control unit periodically performs an operation of obtaining the settable lower virtual link and performance of the settable lower virtual link, and holding the settable lower virtual link and the performance in an associated manner.

Supplementary Note 6

The network control device according to any one of supplementary notes 1 to 5, wherein the lower hierarchical control unit performs an operation of obtaining the settable lower virtual link and performance of the settable lower virtual link, and holding the settable lower virtual link and the performance in an associated manner, when a state of at least either network of the upper layer network or the lower layer network changes.

Supplementary Note 7

The same as the network control method according to the aforementioned second aspect.

Supplementary Note 8

The network control method according to supplementary note 7, wherein performance of the settable lower virtual link includes at least one of a bandwidth, a delay, reliability, and priority of the settable lower virtual link.

Supplementary Note 9

The network control method according to supplementary note 7 or 8, wherein the network control device obtains the settable lower virtual link and performance of the settable lower virtual link, based on topology information about a layer boundary between the upper layer network and the lower layer network, and topology information about the lower layer network.

Supplementary Note 10

The network control method according to any one of supplementary notes 7 to 9, further including, by the network control device, a step of obtaining a route of the flow, based on topology information about the upper layer network, and the settable lower virtual link.

Supplementary Note 11

The network control method according to any one of supplementary notes 7 to 10, wherein the network control device periodically performs an operation of obtaining the settable lower virtual link and performance of the settable lower virtual link, and holding the settable lower virtual link and the performance in an associated manner.

Supplementary Note 12

The network control method according to any one of supplementary notes 7 to 11, wherein the network control device performs an operation of obtaining the settable lower virtual link and performance of the settable lower virtual link, and holding the settable lower virtual link and the performance in an associated manner, when a state of at least either network of the upper layer network or the lower layer network changes.

Supplementary Note 13

The same as the program according to the aforementioned third aspect.

Supplementary Note 14

The program according to supplementary note 13, wherein performance of the settable lower virtual link includes at least one of a bandwidth, a delay, reliability, and priority of the settable lower virtual link.

Supplementary Note 15

The program according to supplementary note 13 or 14, further causing the computer to achieve processing of obtaining the settable lower virtual link and performance of the settable lower virtual link, based on topology information about a layer boundary between the upper layer network and the lower layer network, and topology information about the lower layer network.

Supplementary Note 16

The program according to any one of supplementary notes 13 to 15, further causing the computer to achieve processing of obtaining a route of the flow, based on topology information about the upper layer network, and the settable lower virtual link.

Supplementary Note 17

The program according to any one of supplementary notes 13 to 16, further causing the computer to achieve processing of periodically performing an operation of obtaining the settable lower virtual link and performance of the settable lower virtual link, and holding the settable lower virtual link and the performance in an associated manner.

Supplementary Note 18

The program according to any one of supplementary notes 13 to 17, further causing the computer to achieve processing of performing an operation of obtaining the settable lower virtual link and performance of the settable lower virtual link, and holding the settable lower virtual link and the performance in an associated manner, when a state of at least either network of the first layer network or the second layer network changes.

The entire disclosure of aforementioned PTLs is incorporated herein by reference thereto. The example embodiments may be changed and adjusted within the scope of the entire disclosure (including the claims) of the present invention, and based on the basic technological concept thereof. Further, within the scope of the entire disclosure of the present invention, various disclosed elements (including the respective elements of the claims, the respective elements of the example embodiments, and the respective elements of the drawings) may be combined and selected in a variety of ways. That is to say, it is apparent that the present invention includes various modifications and changes that may be made by a person skilled in the art, in accordance with the entire disclosure including the claims, and the technological concept. In particular, with regard to numerical ranges described herein, any numerical values and small ranges included in the relevant ranges should be interpreted to be specifically described even when there is no particular description thereof. This application claims priority based on Japanese Patent Application No. 2015-044738 filed on Mar. 6, 2015, the disclosure of which is hereby incorporated by reference thereto in its entirety.

REFERENCE SIGNS LIST

1 Network control device
2 Upper hierarchical control unit

3 Lower hierarchical control unit
10 Network control device
20 User request unit
31 Lower layer network
32 Upper layer network
40 Layer boundary
101 User network database
101B, 102B, 103B, 107B Port information
101C, 102C, 103C, 107C Link information
101D, 102D, 103D, 107D Flow information
102 Upper layer network database
102A, 103A Node information
103 Lower layer network database
104 Upper hierarchical control unit
105 Upper layer control unit
106 Lower layer control unit
107 Potential link database
108 Lower hierarchical control unit
202 External database access unit
203 Potential link information management unit
204 Layer boundary information management unit
205 Inter-database-information correspondence management unit
206 Path calculation unit
208 Resource demand prediction unit
209 Capacity design unit
301 Path calculation scheduler
302 Path calculation request database
303 Potential link request database
B501 to B506 Boundary connection (link)
F701 Requested flow
F702 Upper layer flow
F703, F704 Flow set to a lower layer
L001, L002 Upper layer link
L601 to L603 Lower layer link
L901 to L903 Potential link
N11 to N13, N21 to N23 Node
P301 to P310, P401 to P412 Port
P801 to P806 Virtual port

The invention claimed is:

1. A network control device comprising:
upper hierarchical controller configured to accept a request, by a user connecting to an upper layer network, for a settable upper virtual link for connecting ports, obtain performance of the settable upper virtual link, and hold the settable upper virtual link and the performance in an associated manner; and
a lower hierarchical controller stored within a processor configured to accept a request for a settable lower virtual link for connecting ports in the upper layer network through a lower layer network, obtain performance of the settable lower virtual link, and hold the settable lower virtual link and the performance in an associated manner, wherein
the upper hierarchical controller further comprises:
a memory configured to stored one or more instructions; and
a processor configured to execute one or more instructions stored in the memory to implement:
a resource demand prediction unit configured to predict a future request for the upper virtual link, based on a history of requests for a plurality of the settable upper virtual links; and
a capacity design unit configured to calculate a resource of the lower layer network required for supplying the upper virtual link for a predicted request for the upper virtual link,
requests the settable lower virtual link corresponding to an additional resource calculated by the capacity design-unit, to the lower hierarchical controller,
accepts a request for an upper virtual link selected depending on the settable upper virtual link and performance of the settable upper link, and, when a route of a flow related to the requested upper virtual link includes the settable lower virtual link, requests the settable lower virtual link to the lower hierarchical controller and sets a flow related to the settable lower virtual link to the lower layer network;
the lower hierarchical controller obtains the settable lower virtual link and performance of the settable lower virtual link, based on topology information about a layer boundary between the upper layer network and the lower layer network, and topology information about the lower layer network; and
the upper hierarchical controller obtains a route of the flow, based on topology information about the upper layer network, and the settable upper virtual link.

2. The network control device according to claim 1, wherein
performance of the settable lower virtual link includes at least one of a bandwidth, a delay, reliability, and priority of the settable lower virtual link.

3. The network control device according to claim 2, wherein
the lower hierarchical controller obtains the settable lower virtual link and performance of the settable lower virtual link, based on topology information about a layer boundary between the upper layer network and the lower layer network, and topology information about the lower layer network.

4. The network control device according to claim 2, wherein
the upper hierarchical controller obtains a route of the flow, based on topology information about the upper layer network, and the settable upper virtual link.

5. The network control device according to claim 2, wherein
the lower hierarchical controller periodically performs an operation of obtaining the settable lower virtual link and performance of the settable lower virtual link, and holding the settable lower virtual link and the performance in an associated manner.

6. The network control device according to claim 2, wherein
the lower hierarchical controller performs an operation of obtaining the settable lower virtual link and performance of the settable lower virtual link, and holding the settable lower virtual link and the performance in an associated manner, when a state of at least either network of the upper layer network or the lower layer network changes.

7. The network control device according to claim 1, wherein
the lower hierarchical controller periodically performs an operation of obtaining the settable lower virtual link and performance of the settable lower virtual link, and holding the settable lower virtual link and the performance in an associated manner.

8. The network control device according to claim 1, wherein
the lower hierarchical controller performs an operation of obtaining the settable lower virtual link and performance of the settable lower virtual link, and holding the settable lower virtual link and the performance in an associated manner, when a state of at least either network of the upper layer network or the lower layer network changes.

9. The network control device according to claim 1, wherein
the upper hierarchical controller obtains a route of the flow, based on topology information about the upper layer network, and the settable upper virtual link.

10. The network control device according to claim 1, wherein
the lower hierarchical controller periodically performs an operation of obtaining the settable lower virtual link and performance of the settable lower virtual link, and holding the settable lower virtual link and the performance in an associated manner.

11. The network control device according to claim 1, wherein
the lower hierarchical controller performs an operation of obtaining the settable lower virtual link and performance of the settable lower virtual link, and holding the settable lower virtual link and the performance in an associated manner, when a state of at least either network of the upper layer network or the lower layer network changes.

12. A network control method comprising, by a network control device:
accepting a request, by a user connecting to an upper layer network, for a settable upper virtual link for connecting ports, obtaining performance of the settable upper virtual link, and holding the settable upper virtual link and the performance in an associated manner;
accepting a request for a settable lower virtual link for connecting ports in the upper layer network through a lower layer network, obtaining performance of the settable lower virtual link, and holding the settable lower virtual link and the performance in an associated manner;
accepting a request for an upper virtual link selected depending on the settable upper virtual link and performance of the settable upper link;
when a route of a flow related to the requested upper virtual link includes the settable lower virtual link, setting a flow related to the settable lower virtual link to the lower layer network;
predicting a future request for the upper virtual link, based on a history of requests for a plurality of the settable upper virtual links;
calculating a resource of the lower layer network required for supplying the upper virtual link for a predicted request for the upper virtual link;
obtaining the settable lower virtual link and performance of the settable lower virtual link, based on topology information about a layer boundary between the upper layer network and the lower layer network, and topology information about the lower layer network; and
obtaining a route of the flow, based on topology information about the upper layer network, and the settable upper virtual link.

13. The network control method according to claim 12, wherein
performance of the settable lower virtual link includes at least one of a bandwidth, a delay, reliability, and priority of the settable lower virtual link.

14. The network control method according to claim 13, wherein
the network control device obtains the settable lower virtual link and performance of the settable lower virtual link, based on topology information about a layer boundary between the upper layer network and the lower layer network, and topology information about the lower layer network.

15. The network control method according to claim 12, wherein
the network control device obtains the settable lower virtual link and performance of the settable lower virtual link, based on topology information about a layer boundary between the upper layer network and the lower layer network, and topology information about the lower layer network.

16. A non-transitory recording medium for a program causing a computer to achieve:
processing of accepting a request, by a user connecting to an upper layer network, for a settable upper virtual link for connecting ports, obtaining performance of the settable upper virtual link, and holding the settable upper virtual link and the performance in an associated manner;
processing of accepting a request for a settable lower virtual link for connecting ports in the upper layer network through a lower layer network, obtaining performance of the settable lower virtual link, and holding the settable lower virtual link and the performance in an associated manner;
processing of accepting a request for an upper virtual link selected depending on the settable upper virtual link and performance of the settable upper virtual link;
processing of, when a route of a flow related to the requested upper virtual link includes the settable lower virtual link, setting a flow related to the settable lower virtual link to the lower layer network;
processing of predicting a future request for the upper virtual link, based on a history of requests for a plurality of the settable upper virtual links;
processing of calculating a resource of the lower layer network required for supplying the upper virtual link for a predicted request for the upper virtual link
processing of obtaining the settable lower virtual link and performance of the settable lower virtual link, based on topology information about a layer boundary between the upper layer network and the lower layer network, and topology information about the lower layer network; and
processing of obtaining a route of the flow, based on topology information about the upper layer network, and the settable upper virtual link.

* * * * *